United States Patent
Morrison et al.

(10) Patent No.: US 12,012,210 B2
(45) Date of Patent: Jun. 18, 2024

(54) MULTIFUNCTION DYNAMIC VISUAL DISPLAY FOR INTERACTIVE USER EXPERIENCE

(71) Applicant: Alakai Technologies Corporation, Stow, MA (US)

(72) Inventors: Brian D. Morrison, Hopkinton, MA (US); Peter F. Falt, Thousand Oaks, CA (US)

(73) Assignee: Alakai Technologies Corporation, Stow, MA (US)

( * ) Notice: Subject to any disclaimer, the term of this patent is extended or adjusted under 35 U.S.C. 154(b) by 163 days.

(21) Appl. No.: 17/512,148

(22) Filed: Oct. 27, 2021

(65) Prior Publication Data

US 2022/0135228 A1    May 5, 2022

Related U.S. Application Data

(60) Provisional application No. 63/108,090, filed on Oct. 30, 2020.

(51) Int. Cl.
| | | |
|---|---|---|
| *B64D 11/00* | (2006.01) | |
| *G05D 1/00* | (2006.01) | |
| *H04L 12/40* | (2006.01) | |

(52) U.S. Cl.
CPC ........... *B64D 11/00* (2013.01); *G05D 1/0669* (2013.01); *H04L 12/40* (2013.01); *H04L 2012/40215* (2013.01); *H04L 2012/4028* (2013.01)

(58) Field of Classification Search
CPC ........ B64D 11/00; G05D 1/0669; H04L 12/40
See application file for complete search history.

(56) References Cited

U.S. PATENT DOCUMENTS

| | | | | |
|---|---|---|---|---|
| 5,428,806 | A | 6/1995 | Pocrass | |
| 9,527,601 | B2 * | 12/2016 | Wyatt | .................. G08G 5/025 |
| 10,957,247 | B1 * | 3/2021 | Raynal | ................. G09G 3/3225 |

(Continued)

OTHER PUBLICATIONS

Justinmind, "Interactive Mockups: Visuals and Functionality," Mar. 4, 2020 Retrieved on Dec. 30, 2021 from <https://www.justinmind.com/blog/interactive-mockup/>.

(Continued)

*Primary Examiner* — Seth A Silverman
(74) *Attorney, Agent, or Firm* — Morse, Barnes-Brown & Pendleton, P.C.; Sean D. Detweiler, Esq.

(57) ABSTRACT

An integrated multifunction dynamic display system and method for an air vehicle that provides an interactive user experience. The system is based around an array of multifunction display nodes that are disposed throughout the air vehicle. The multifunction display nodes are connected through a databus or network such that the display nodes can operate individually or in combination to create a desired interactive experience. The nodes can include interior lighting, exterior lighting, interior displays, exterior displays, and windows. The multifunction dynamic display system can be used to control or otherwise provide interior lighting or displays, loading/unloading instruction, inflight entertainment or information, emergency notification and instruction, augmented reality, external lighting and displays. In addition, the multifunction dynamic display can be configured for each passenger.

28 Claims, 22 Drawing Sheets

(56) References Cited

U.S. PATENT DOCUMENTS

| | | | |
|---|---|---|---|
| 2006/0260392 A1* | 11/2006 | Hedrick | G01F 23/165 |
| | | | 702/55 |
| 2012/0083945 A1 | 4/2012 | Oakley et al. | |
| 2013/0013133 A1 | 1/2013 | Walter | |
| 2014/0059468 A1* | 2/2014 | Allgair | G06Q 10/06311 |
| | | | 715/771 |
| 2015/0353192 A1 | 12/2015 | Morrison | |
| 2016/0009393 A1* | 1/2016 | Repp | H04N 23/51 |
| | | | 254/323 |
| 2016/0114890 A1* | 4/2016 | Gagnon | G06F 3/0416 |
| | | | 345/173 |
| 2018/0113241 A1* | 4/2018 | Powell | G02B 5/32 |
| 2019/0340932 A1* | 11/2019 | Gannon | G08G 5/0052 |
| 2020/0002024 A1* | 1/2020 | Johannessen | B64D 45/00 |
| 2020/0057783 A1 | 2/2020 | Ricci | |
| 2021/0117069 A1* | 4/2021 | Komer | G01C 23/00 |
| 2021/0203661 A1* | 7/2021 | Sankey | H04W 12/08 |
| 2021/0208779 A1* | 7/2021 | Nielsen | G06F 3/04847 |

OTHER PUBLICATIONS

International Search Report from International Application No. PCT/US2021/056866, dated Feb. 2, 2022.

* cited by examiner

MULTIFUNCTION DYNAMIC VISUAL DISPLAY FOR INTERACTIVE USER EXPERIENCE

CROSS-REFERENCE TO RELATED APPLICATION(S)

This application claims priority to, and the benefit of, U.S. Provisional Application 63/108,090, filed Oct. 30, 2020, for all subject matter common to both applications. The disclosure of said provisional application is hereby incorporated by reference in its entirety.

FIELD OF THE INVENTION

The present invention is directed to a multifunction dynamic visual display for an interactive user experience system, method and apparatus. It finds particular, although not exclusive, application to multi-surface component presentation displays in air vehicles, for example providing interactive displays for a full-scale, clean fuel, electric-powered (low or no emission) vertical takeoff and landing (eVTOL) on-board fuel cell powered electric multirotor aircraft, including Advanced Air Mobility (AAM) aircraft, where the fuel cell module or other on-board source of power transforms hydrogen and oxygen into electricity that is then used to power and operate multiple components via network or other interfaces including components of the multifunction dynamic visual display system. By using the output or results of measurements performed by onboard sensor devices to inform computer processors monitoring operating conditions, the displays, methods and systems can use data related to passengers, vehicles, or flight paths to improve air vehicle operability, safety, comfort, and user experience.

BACKGROUND

Although reduced scale multirotor aircraft (sometimes called multi-copters) are not new, they have been reduced scale models not intended for the rigors or requirements of carrying human passengers, and are mostly used either as toys, or for limited-duration surveillance or aerial photography missions with motion being controlled by radio-control remotes, or for flying pre-planned routes. For example, US Patent Application 20120083945 relates specifically to a reduced scale multi-copter, but does not address the safety, structural, or redundancy features necessary for an FAA-certified passenger-carrying implementation, nor any of the systems required to implement a practical, passenger-carrying vehicle with fault-tolerance and state-variable analysis, nor any way of generating its own power from fuel carried on-board. The dynamics, safety and information requirements of providing a full-scale air vehicle capable of safely and reliably carrying human passengers and operating within US and foreign airspace are significantly different that those of previous reduced scale models.

A large volume of personal travel today occurs by air. For destinations of more than 500 miles, it has historically been the fastest travel mode and, in terms of injuries per passenger mile, the safest. However, only about 200 hub and spoke airports exist within the US, placing much of the population more than 30 minutes away from an airport. Yet there are over 5,300 small control-towered regional airports, and over 19,000 small airfields with limited or no control towers throughout the US, placing more than 97% of the population within 15 to 30 minutes of an airfield. As many have noted before, this is a vastly under-utilized capability.

In the 21st Century, the opportunity is available to apply advanced technologies of the evolving National Airspace System (NAS) to enable more-distributed, decentralized travel in the three-dimensional airspace, leaving behind many of the constraints of the existing hub-and-spoke airport system, and the congestion of the 2-dimensional interstate and commuter highway systems.

Many large cities and metropolitan areas are virtually gridlocked by commuter traffic, with major arteries already at or above capacity, and with housing and existing businesses posing serious obstacles to widening or further construction. NASA, in its 'Life After Airliners' series of presentations (see Life After Airliners VI, EAA AirVenture 2003, Oshkosh, WI. Aug. 3, 2003, and Life After Airliners VII, EAA AirVenture 2004, Oshkosh, WI. Jul. 30, 2004) and NASA's Dr. Bruce Holmes (see Small Aircraft Transportation System—A Vision for 21st Century Transportation Alternatives, Dr. Bruce J. Holmes, NASA Langley Research Center. 2002) make the case for a future of aviation that is based on the hierarchical integration of Personal Air Vehicles (PAV), operating in an on-demand, disaggregated, distributed, point-to-point and scalable manner, to provide short haul air mobility. Such a system would rely heavily on the $21^{st}$ century integrated airspace, automation and technology rather than today's centralized, aggregated, hub-and-spoke system. The first, or lowest tier in this hierarchical vision are small, personal Air Mobility Vehicles or aircraft, allowing people to move efficiently and simply from point-to-any-point, without being restricted by ground transportation congestion or the availability of high-capability airports. Key requirements include vehicle automation, operations in non-radar-equipped airspace and at non-towered facilities, green technologies for propulsion, increased safety and reliability, and en-route procedures and systems for integrated operation within the National Airspace System (NAS) or foreign equivalents. Ultimate goals cited by NASA include an automated self-operated air vehicles, and a non-hydrocarbon-powered air vehicles for intra-urban transportation. NASA predicts that, in time, up to 45% of all future miles traveled will be in Personal Air Vehicles.

Therefore, described here is a multifunction dynamic visual display for an interactive user experience system to manage data and provide enhanced user interaction in a full scale multi-copter implementation that finds applications for commuting, for recreation, for inter-city transportation, for industrial, for delivery, or for security and surveillance applications among others with or without human passengers on board, based on state-of-the-art electric motor and electronics and computer technology with high reliability, safety, simplicity, and redundant control features, with on-board capability to generate its own electrical power (as opposed to simply consuming energy previously stored in electro-chemical batteries), coupled with advanced avionics and flight control techniques.

Generally, multirotor aircraft have been reduced scale models not intended for the rigors or requirements of carrying human passengers. As a result, these devices generally rely upon simplistic power production systems that include basic batteries, heat sinks, and electric motors but lack the internet connectivity, interactive data transmission for pre-flight, in-flight and post-flight passenger instruction, internal lighting, window mechanisms, seating components, entertainment screens, safety features and guidance, viewing aids, ambience adjustment, climate controls, cooling fans, monitoring devices, passenger communication, comfort devices, and emergency equipment and procedures that passenger carrying powered vehicles commonly provide.

The dynamics and integrity requirements of providing a full-scale air vehicles capable of safely and reliably carrying human passengers are significantly different that those of reduced scale models. Such a vehicle requires state-of-the-art electric motors, electronics and computer technology with high reliability, safety, simplicity, and redundant control features, with on-board capability to generate electrical power, coupled with advanced avionics, flight control techniques and user safety features. Generating and distributing electrical power aboard the air vehicle presents several challenges including inefficient performance and consumption of resources, pollution, greater cost, greater weight or space consumption, restrictions on vehicle configuration, and unwanted vehicle component complexity and redundancy.

Generating electrical power using a fuel cell is an attractive alternative. A fuel cell consumes the fuel with the net result of the two redox reactions producing electric current which can be used to power electrical devices, normally referred to as the load, as well as creating water or carbon dioxide and heat as the only other products. A fuel, for example hydrogen, is supplied to the anode, and air is supplied to the cathode. A catalyst at the anode causes the fuel to undergo oxidation reactions that generate ions (often positively charged hydrogen ions or protons) and negatively charged electrons, which take different paths to the cathode. The anode catalyst, usually fine platinum powder, breaks down the fuel into electrons and ions, where the electrons travel from the anode to the cathode through an external circuit, creating a flow of electricity across a voltage drop, producing direct current electricity. The ions move from the anode to the cathode through the electrolyte. An electrolyte that allows ions, often positively charged hydrogen ions (protons), to move between the two sides of the fuel cell. The electrolyte substance, which usually defines the type of fuel cell, and can be made from a number of substances like potassium hydroxide, salt carbonates, and phosphoric acid. The ions or protons migrate through the electrolyte to the cathode. At the cathode, another catalyst causes ions, electrons, and oxygen to react. The cathode catalyst, often nickel, converts ions into waste, forming water as the principal by-product. Thus, for hydrogen fuel, electrons combine with oxygen and the protons to produce only generated electricity, water and heat.

Fuel cells are versatile and scalable and can provide power for systems as large as power stations or locomotives, and as small as personal electronic devices or hobby drones. The fuel and the electrolyte substance define the type of fuel cell. A fuel cell uses the chemical energy of hydrogen or another fuel to cleanly and efficiently produce electricity. Fuel cells create electricity chemically, rather than by combustion, so they are not subject to certain thermodynamic laws that limit a conventional power plant (e.g. Carnot Limit). Therefore, fuel cells are most often more efficient in extracting energy from a fuel than conventional fuel combustion. Some fuel cells need pure hydrogen, and other fuel cells can tolerate some impurities, but might need higher temperatures to run efficiently. Liquid electrolytes circulate in some cells, which require pumps and other additional equipment that decreases the viability of using such cells in dynamic, space restricted environments. Ion-exchange membrane electrolytes possess enhanced efficiency and durability at reduced cost. The solid, flexible electrolyte of Proton Exchange Membrane (PEM) fuel cells will not leak or crack, and these cells operate at a low enough temperature to make them suitable for vehicles. But these fuels must be purified, therefore demanding pre-processing equipment such as a "reformer" or electrolyzer to purify the fuel, increasing complexity while decreasing available space in a system. A platinum catalyst is often used on both sides of the membrane, raising costs. Individual fuel cells produce only modest amounts of direct current (DC) electricity, and in practice, require many fuel cells assembled into a stack. This poses difficulties in air vehicle implementations where significant power generation is required but space and particularly weight must be minimized, requiring a more efficient method to implement the relevant chemical reaction, electromagnetic, and thermodynamic principles in a variety of settings and conditions to achieve viable flight performance, while replacing required information and data conveyance to users that was formerly performed by personnel or dedicated components that no longer meet space or weight requirements.

When providing passenger transport in a multirotor aircraft, these functions that would be carried out by service personnel or dedicated components in larger transport category aircraft must still be carried out but must be fit within requirements for greatly reduced physical space and mass requirements, and so must be consolidated into electronic and visual means without the need for a cabin attendant, using fewer, lighter components that perform the necessary functions, thereby reducing part count while increasing the flexibility and interoperability of important components and devices. Automated displays and interactive information presentation must replace several required safety, comfort and experience functions including but not limited to directing passengers along the proper route to an assigned seat, providing a reference to locate vehicle features and trip data, indicating safety features and the location of emergency features or evacuation routes, and providing instructions to embark, disembark, be seated in the proper seat, retrieve luggage, notification of a connection, indication of arrival, when to fasten seatbelts or similar restraints, where to look for assistance with internet connectivity, where to obtain messaging or additional assistance. Messages and guidance can be provided via display panel, or via "smart glass" where the window itself becomes part of the messaging infrastructure. Messages may also be embodied on the sided, rear, or bottom of the vehicle to serve as caution, warning, or advertising displays while on the ground or in flight.

SUMMARY

There is a need for an improved lightweight, reliable, multifunction dynamic visual display system, method and apparatus for an interactive user experience in vehicle applications including a full-scale, clean fuel, electric-powered VTOL aircraft that leverages advantageous characteristics in its design to improve efficiency and effectiveness to dynamically meet various display needs of an aircraft (including Advanced Air Mobility aircraft) while using readily available resources instead of consuming or requiring additional resources to function at preferred operating conditions for efficient vehicle performance. Further there is a need to replace functions performed by service personnel or dedicated components in larger vehicles while limiting the number, mass, and size of systems due to restrictions on the volume and mass of a vehicle required by constraints including flight parameters that must be adhered to in order to successfully maintain vehicle operation. The present invention is directed toward further solutions to address this need, in addition to having other desirable characteristics.

Specifically, the present invention relates to a system, method and apparatus for managing generation and distribution of electrical power using fuel cell modules in a full-scale vertical takeoff and landing manned or unmanned aircraft, including Advanced Air Mobility (AAM) aircraft, having a lightweight airframe fuselage or multirotor airframe fuselage containing a system to generate electricity from fuels such as gaseous hydrogen, liquid hydrogen, or other common fuels (including compressed, liquid or gaseous fuels); an electric lift and propulsion system mounted to a lightweight multirotor airframe fuselage or other frame structure; counter-rotating pairs of AC or DC brushless electric motors each driving a propeller or rotor; an integrated avionics system for navigation; a redundant autopilot system to manage motors, maintain vehicle stability, maintain flight vectors and parameters, control power and fuel supply and distribution, operate mechanisms and control thermodynamic operating conditions or other vehicle performance as understood by one of ordinary skill in the art; a tablet-computer-based mission planning and vehicle control system to provide the operator with the ability to pre-plan a route and have the system fly to the destination via autopilot or to directly control thrust, pitch, roll and yaw through movement of the tablet computer or a set of operator joysticks; and ADSB or ADSB-like capability (including Remote ID) to provide traffic and situational awareness, weather display and warnings. Remote ID, as utilized herein, refers to the ability of an unmanned aircraft system (UAS) in flight to provide identification information that can be received by other parties consistent with rules and protocols promulgated by the Federal Aviation Administration (FAA). Control system and computer monitoring, including automatic computer monitoring by programmed single or redundant digital autopilot control units (autopilot computers), or motor management computers, controls each motor-controller and motor to produce pitch, bank, yaw and elevation, while simultaneously using on-board inertial sensors to maintain vehicle stability and restrict the flight regime that the pilot or route planning software can command, to protect the vehicle from inadvertent steep bank or pitch, or other potentially harmful acts that might lead to loss of control, while also simultaneously controlling cooling system and heating system parameters, valves and pumps while measuring, calculating, and adjusting temperature and heat transfer of aircraft components and zones, to protect motors, fuel cells, and other critical components from exceeding operating parameters and to provide a safe, comfortable environment for occupants during flight. Sensed parameter values about vehicle state are used to detect when recommended vehicle operating parameters are about to be exceeded. By using the feedback from vehicle state measurements to inform motor control commands, and by voting among redundant autopilot computers, the methods and systems contribute to the operational simplicity, stability, reliability, safety and low cost of the vehicle. These same integrated components managed by voting among redundant autopilot computers are further extended to provide a set of multifunction visual display nodes that cooperate with the other systems to automatically display data and provide an interactive experience that leverages redundant interconnectivity of the system. In the event operating parameters are exceeded past set acceptable limits or safety factors, the emergency systems may be engaged that provide passengers additional information displays automatically to direct passengers to undertake appropriate action or procedures without the need for intervention by aircraft personnel. Power is provided by one or more on-board fuel cell modules for generating electrical voltage and current, electronics to monitor and control electrical generation and controllers to control the commanded voltage and current to each motor and to measure its performance (which may include such metrics as resulting RPM, current, torque and temperature among others). Fuel cell modules, motors, motor controllers, batteries, circuit boards, and other electronics must have excess or waste heat removed or dissipated. That heat exchanger, in turn, can help to cool the waste heat from the fuel cells or be employed to contribute to cooling the aircraft cabin for occupant comfort. Thermal energy that is a by-product of generating power, or storing liquid fuel and converting it into gaseous state, is used to provide heating and cooling in the passenger area of the vehicle. These systems are further controlled using the multifunction visual display nodes to provide for customizable user comfort in an easy to use interface.

This invention addresses part of the core design of a full-scale, clean-fueled, electric multirotor vehicle, particularly a full-scale multirotor aircraft, also referred to herein as a multirotor aircraft, a Personal Air Vehicle (PAV), an Air Mobility Vehicle (AMV), or Advanced Air Mobility (AAM) vehicle, as one part of the On-Demand, Widely Distributed Point-to-Any Point $21^{st}$ Century Air Mobility system. For clarity, any reference to a multirotor aircraft herein, includes any or all of the above noted vehicles, including but not limited to AAM aircraft. Operation of the vehicle is simple and attractive to many operators when operating under visual flight rules (VFR) in Class E or Class G airspace as identified by the Federal Aviation Administration, thus in most commuter situations not requiring any radio interactions with air traffic control towers. In other cases, the vehicle may be operated in other airspace classes, in VFR and IFR (Instrument Flight Rules) and Part 135 (aircraft for hire) operations, in the US or the equivalent regulations of other countries including, but not limited to, those with whom the US maintains a bilateral agreement governing aircraft certifications and operations.

Among the many uses for this class of vehicle are the next generation of personal transportation including commuting, local travel, air taxi services, emergency medical services, disaster-relief operations, and recreation (as well as other uses) where operators need not have the level of piloting skills necessary for more complex, traditional aircraft or helicopters. This evolution is referred to as Personal Air Vehicles (PAV) or Air Mobility Vehicles (AMV). The vehicle also has autonomous or unmanned application of utility to law enforcement, border patrol, military surveillance, emergency relief aid, and commercial users.

The vehicle is equipped with redundant Autopilot Computers to accept control inputs by the operator (using controls commonly referred to as "joysticks" or sidearm controllers, or using the tablet computer's motion to mimic throttle and joystick commands) and manage commands to the electric motor controllers, advanced avionics and GPS equipment to provide location, terrain and highway in the sky displays, and a simplified, game-like control system that allows even casual users to master the system after a brief demonstration flight. A tablet-computer provides mission planning and vehicle control system capabilities to give the operator the ability to pre-plan a route and have the system fly to the destination via autopilot, or manually control thrust, pitch, roll and yaw through movement of the tablet computer itself. Control inputs can alternatively be made using a throttle for vertical lift (propeller RPM or torque) control, and a joystick for pitch (nose up/down angle) and bank (angle to left or right) control, or a multi-axis joystick to combine elements of pitch, bank and thrust in one or more control elements, depending on user preferences. The autopilot control unit or motor management computer measures control inputs by the operator or autopilot directions, translates this into commands to the controllers for the individual electric motors according to a known performance table or relevant calculation, then supervises motor reaction to said commands, and monitors vehicle state data (pitch, bank, yaw, pitch rate, bank rate, yaw rate, vertical acceleration, lateral acceleration, longitudinal acceleration, GPS speed, vertical speed, air speed and other factors) to ensure operation of the vehicle remains within the desired envelope. The same sensor, state, command and control data processed by the tablet-computer mission planning and autopilot control units or motor management computers can be additionally provided on demand to passengers or other users through a networked system of independently operating components that may include user interfaces, screens and other components such as ambient lighting, dynamic messaging, smart windows or augmented reality displays. This data can also be used by the system to alter lighting or displays to provide an interactive user experience that increases comfort and enjoyability through selectable or automatically adjusting settings that respond to different environmental or operating conditions (e.g. raising light levels during night trips or blocking direct sunlight penetrating into a cabin interior).

In accordance with example embodiments of the present invention, an integrated multifunctional dynamic display system for an aircraft that provides an interactive user experience is disclosed. The system comprises an array of multifunction visual display nodes disposed throughout the aircraft in communication with a databus or network. Each node includes at least one transceiver linking to the databus or network; a processor in communication with the transceiver, a display element configured to alter function in response to commands received via the databus or network.

The databus or network may be wired or wireless. In accordance with aspects of the present invention, the databus or network comprises a Controller Area Network (CAN) network. In other aspects, the databus or network is an ethernet network or a wireless network using low-power Wi-Fi.

In accordance with aspects of the present invention, each node further comprises an audio output. In certain aspects, the audio output is a speaker. In other aspects, the audio output is a surface transducer.

In accordance with aspects of the present invention, each display element has a dedicated electrical power line and a network connection, and a dedicated protocol address making each of the one or more display elements uniquely addressable using CAN commands in an example embodiment enabling varying of display element output with a defined protocol.

In accordance with aspects of the present invention, the processor of each of the multifunction visual display nodes can comprise one or more of a central processing unit (CPU), a microprocessor, or a control unit, each collectively programmed to activate a respective one or more of the multifunction visual display nodes based on different patterns received by commands to create a borderless combined display across multiple of the multifunction visual display nodes disposed on a vehicle.

In accordance with aspects of the present invention, the display element comprises one or more of screens, light boards, lamps, smart windows, strips, arrays, surfaces, fixtures, beacons, LED chains, LED embedded components, LCD panels, and LED or LCD embedded surfaces. The display element can comprise an array of multicolor LEDS or similar devices to display data and information in human-readable form.

In accordance with aspects of the present invention, one or more of the multifunction visual display nodes can be disposed on interior and/or exterior surfaces of a vehicle to provide a comprehensive vehicle display controlled by one or more of interfaces, sensors, switches, actuators and controls. The system can be configured for a user device to accesses a control interface and input commands delivered to one or more of the multifunction visual display nodes, altering output of display elements disposed on the vehicle. Also, a remote processor can be configured to provide commands delivered to the multifunction visual display nodes, altering output of the display elements disposed on the vehicle. Also, one or more onboard processors or sensors can be configured to provide commands delivered to the multifunction visual display nodes, altering output of the display elements disposed on the vehicle. The commands delivered to the multifunction visual display nodes, altering output of the display elements disposed on the vehicle can be based on user information access from a stored user account. The one or more of the multifunction visual display nodes can be inward facing and disposed on an interior of a vehicle. The one or more of the multifunction visual display nodes can be outward facing and disposed on an exterior of a vehicle to broadcast to persons below or outside the vehicle, including for information display, caution, warning, or advertising purposes. The one or more display elements are linked to display a customizable borderless message comprising alphanumeric characters digitally depicted by a plurality of LEDS.

In accordance with aspects of the present invention, one or more multifunction visual display nodes can be configured for wireless internet connection such that the one or more multifunction visual display nodes accessed via air-to-ground or ground-to-air networking using native processors of the communications networks or an on-board communications hub together with one or more user devices or one or more display elements comprising screens as a user interface. The one or more display elements can be configured to alter streaming characters represented by LEDS on a screen based upon downloadable output supplied using air-to-ground and/or ground-to-air networking.

In accordance with aspects of the present invention, one or more display elements comprising lamps or LEDs and can be configured to receive command signals and/or varying voltage that accordingly alter one or more of light color, light wavelength emitted, lighting level, light transmission through a medium, light reflection, light refraction, light intensity, light brightness, light hue, luminosity, light positioning, light direction, light focusing, light timing, light flashing intervals, NAV display, lighting mode, menu item or projected message content. The display elements can comprise lamps or LEDs and can be configured to receive command signals and/or varying voltage that accordingly alter one or more of focus, synchronization, or timing of multiple LEDS to project light to a particular object within a vehicle interior. Vehicle or flight data can be selectively accessed by operation of one or more of user interfaces, sensors, switches, actuators, control devices, touch screens, touch controls, GUIs, consoles, remote processors, user electronic devices, based upon programmed parameters associated with a requesting device and identified by the system using the processor and onboard or remotely stored data. The display elements can be configured to receive command signals and/or varying voltage that alter transmittance of a set of one or more screens or windows to adjust an ambient lighting level or opacity according to input user comfort preferences. The display elements can be configured to receive command signals and/or varying voltage that alter a set of one or more screens or windows to provide an augmented reality display supplementing information related to objects viewed through the one or more screens or windows. The display elements can be configured to receive command signals and/or varying voltage that alter functions according to one or more onboard sensor outputs. The one or more onboard sensor outputs can comprise output from one or more of an embedded or stand-alone air data computer, an embedded or stand-alone inertial measurement device, automatic computer monitoring by programmed single or redundant digital autopilot control units, motor management computers, air data sensors, temperature sensors, thermocouples, thermometers, embedded GPS receivers, GPS devices, inertial sensors, motion sensors, collision sensors, proximity sensors, pressure sensors, pressure gauges, level sensors, vacuum gauges, fuel gauges, fluid gauges, pump sensors, magnetic sensors, valve sensors, pressure safety valves, pressure regulators, pressure build units, monitor, air sensors and airflow oxygen sensors fuel cell modules configured to self-measure, motor controllers configured to self-measure and report parameters using the Controller Area Network (CAN) bus and sensor devices designed to measure one or more of air speed, vertical speed, pressure altitude, GPS altitude, GPS latitude, GPS longitude, outside-air temperature (OAT), pitch angle, bank angle, yaw angle, pitch rate, bank rate, yaw rate, longitudinal acceleration, lateral acceleration, and vertical acceleration. The functions of one or more display elements are altered according to pre-programmed settings initiated in response to received onboard sensor output. The output of the one or more display elements can comprise one or more of onboard warning messages, updated notifications, emergency messages, emergency instructions or evacuation data. The output of the one or more display elements can comprise one or more of boarding location information, seat locating information, safety procedure information, entertainment use information, connectivity instructions, customized to a specific user identified by the system. The output of the one or more display elements can comprise one or more of a welcome message, a departure message, a destination message, and last mile data customized to a specific user identified by the system using stored user data and/or user devices identified by the system as onboard. The output of the one or more display elements can comprise a dynamic pattern of illumination indicating a direction of travel to embark or disembark.

In accordance with example embodiments of the present invention, an integrated multifunctional dynamic display method for an interactive user experience on an aircraft includes providing an array of multifunction visual display nodes disposed throughout a vehicle in communication with a wired or fiber-optic Controller Area Network (CAN) databus network or wireless network, as discussed above; receiving, at the transceiver of one of the nodes, a command via the databus or network; and altering the function of the display element of the node as directed by the processor of the node in response to the received command.

In accordance with example embodiments of the present invention, an integrated multifunctional dynamic display apparatus for an interactive user experience comprises an array of sensor or input devices in electronic communication with a processor or control unit comprising programmable logic and commands in electronic communication with a databus or network with a message-based protocol connecting one or more cross-communication channels or communications networks of local components comprising an array of multifunction visual display nodes disposed throughout a vehicle, each individually controllable and individually communicating commands. The multifunction visual display nodes comprise at least one transceiver linking to the databus or network; one or more controller components; one or more processing components, one or more display elements configured to alter function when voltage, light, or electronic commands are received by one or more of the multifunction visual display nodes. The system comprises one or more power supplies and one or more circuits transmitting electrical power to the one or more cross-communication channels or communications networks of local components.

BRIEF DESCRIPTION OF THE DRAWINGS

The invention description below refers to the accompanying drawings, of which.

DETAILED DESCRIPTION

Figure 1A:
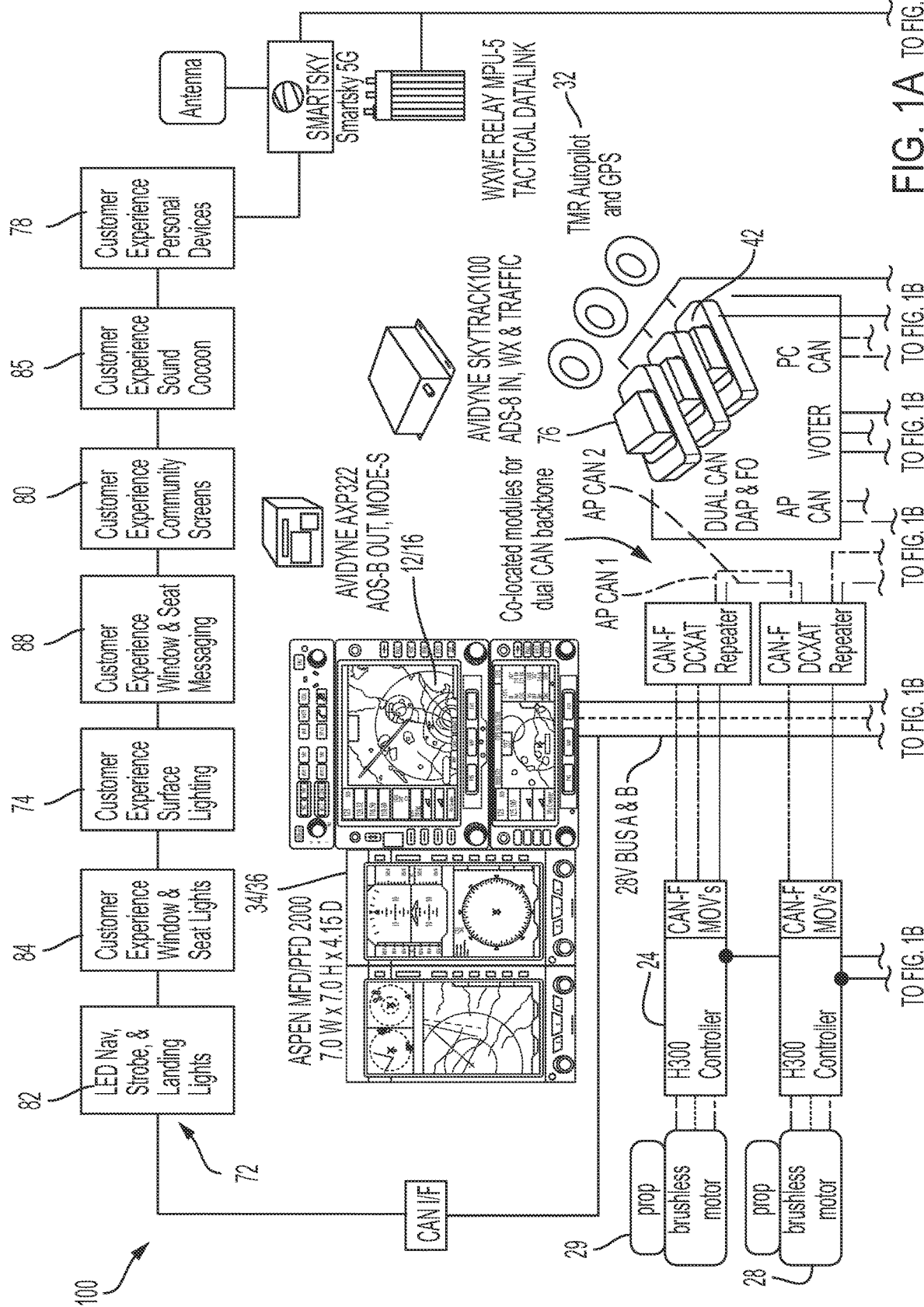
FIG. 1 (FIGS. 1A, 1B, 1C, and 1D collectively) depicts an example block diagram depicting an apparatus for practicing the present invention, including logic controlling the integrated system and related components.
Figure 1B:
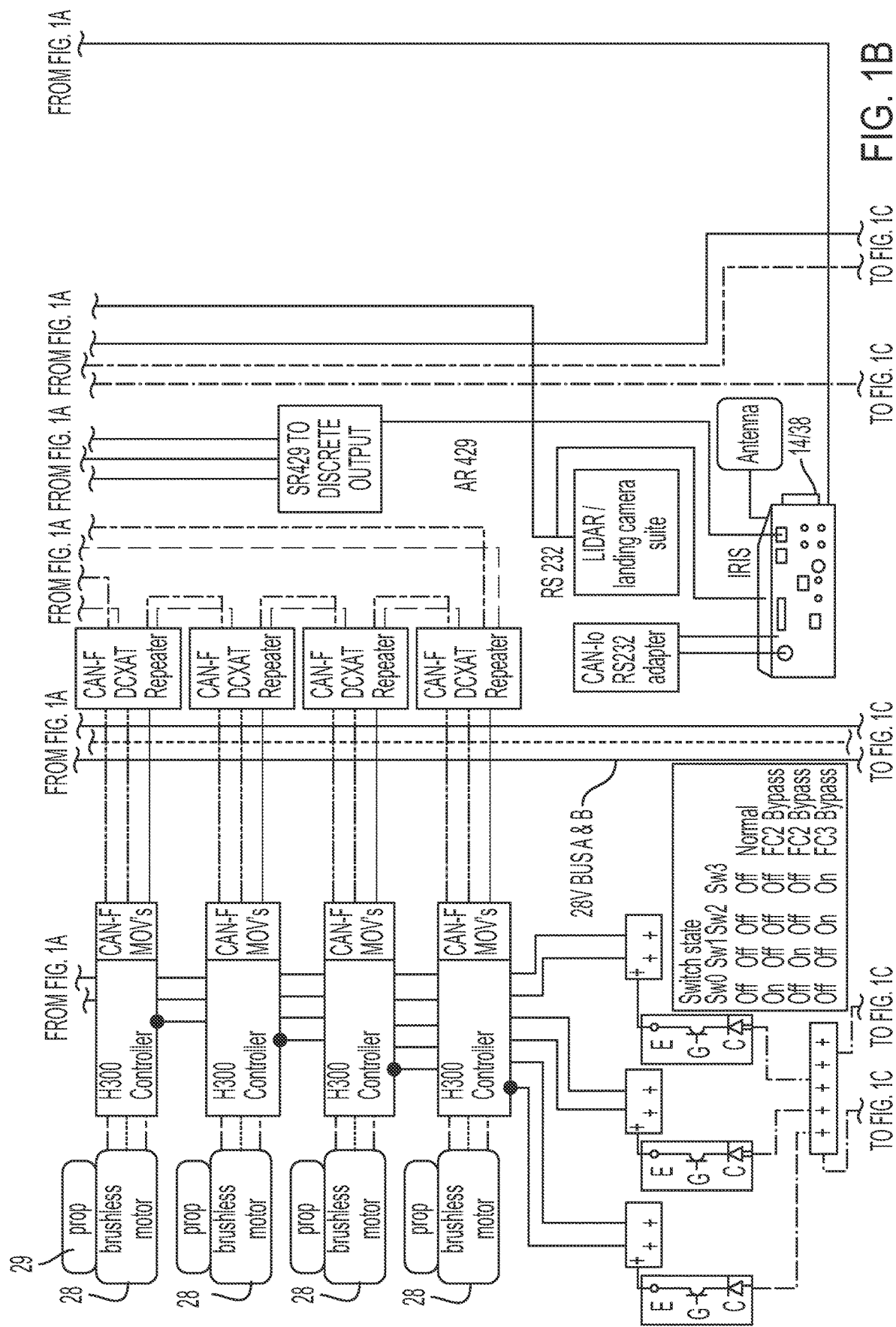
Figure 1C:
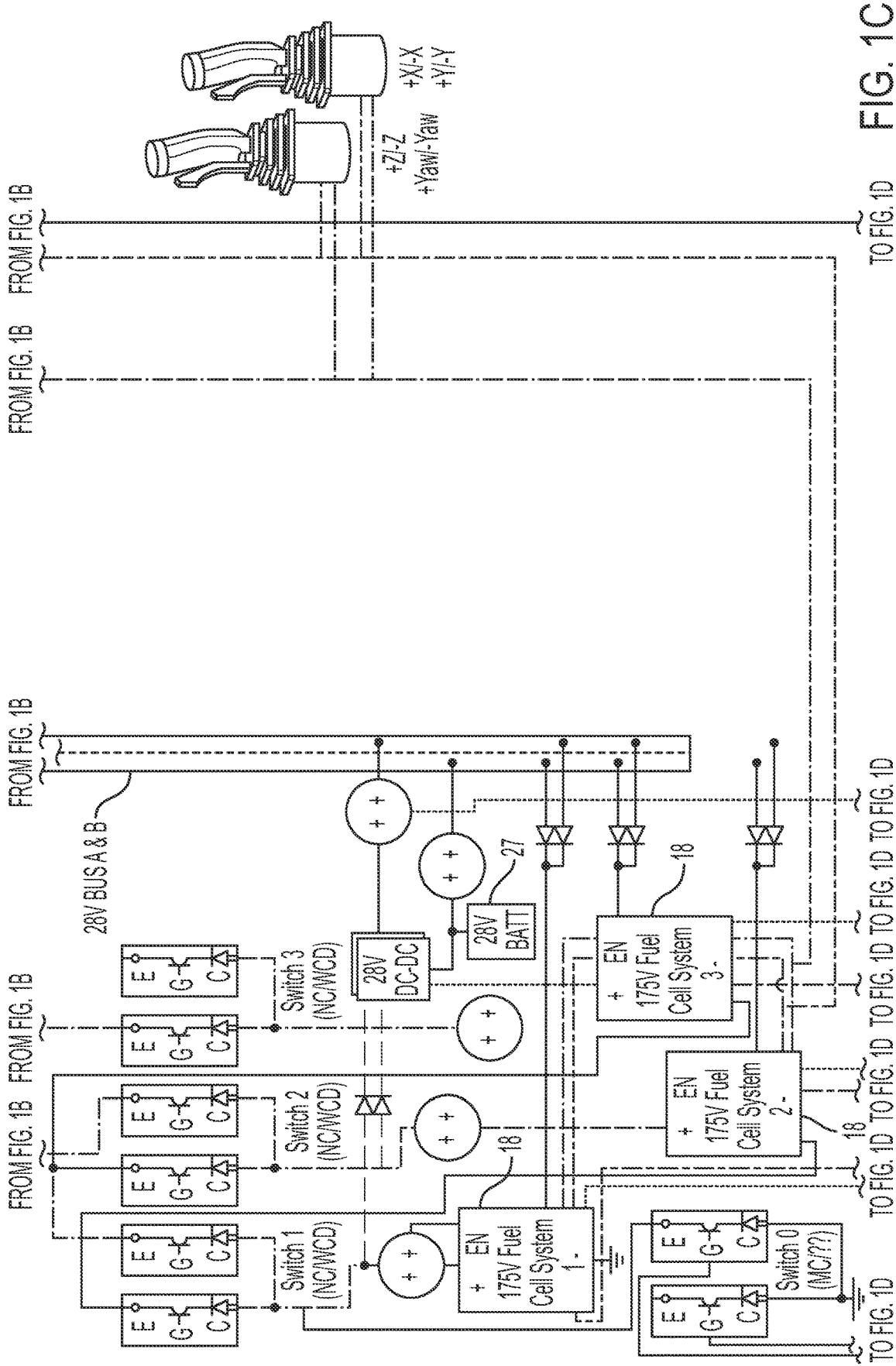
Figure 1D:
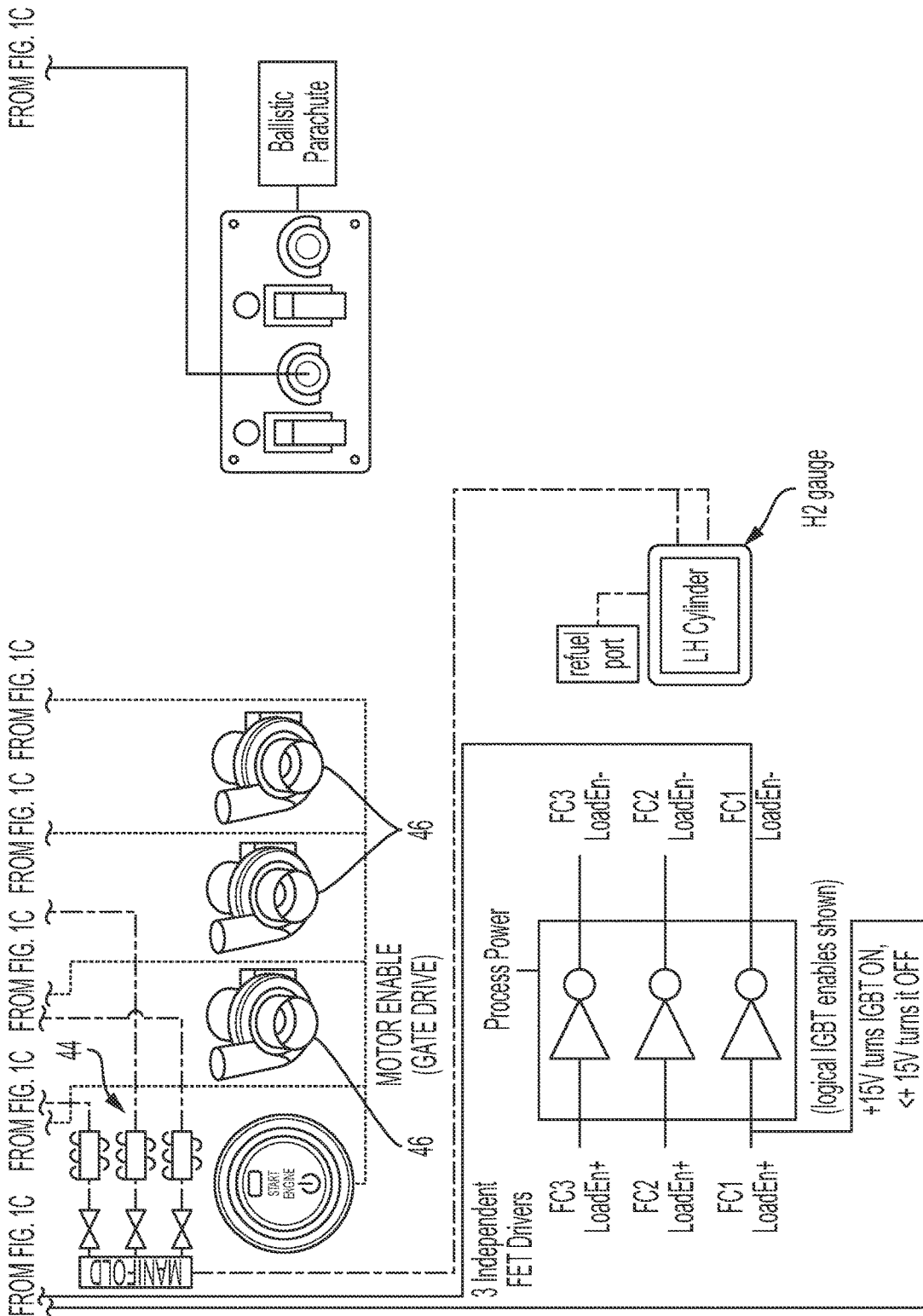

To provide an overall understanding, certain illustrative embodiments will now be described; however, it will be understood by one of skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods.

An illustrative embodiment of the present invention relates to an integrated multifunction dynamic display system for an air vehicle that provides an interactive user experience. The system is based around an array of multifunction display nodes that are disposed throughout the air vehicle. The multifunction display nodes are connected through a wired or wireless databus or network (for example a CAN network) such that the display nodes can operate individually or in combination to create a desired interactive experience. The nodes can include interior lighting, interior audio, exterior lighting, exterior audio, interior displays, exterior displays, and windows. The multifunction dynamic display system can be used to control or otherwise provide interior lighting or displays, interior audio or announcements, interior video or announcements, loading/unloading instruction, inflight entertainment or information, emergency notification and instruction, augmented reality, external lighting and displays, and exterior audio or video or announcements. In addition, the multifunction dynamic display can be modified, tailored, or otherwise configured for each passenger and may be informed by data from their reservation, their smart device, or their social media accounts, or other available data.

FIGS. 1A-19, wherein like parts are designated by like reference numerals throughout, illustrate an example embodiment or embodiments of a lightweight, high power density, fault-tolerant fuel cell system, method and apparatus for a full-scale, clean fuel, electric-powered multirotor air vehicle, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 (FIGS. 1A, 1B, 1C, and 1D collectively) depicts an example block diagram form one type of system 100 that may be employed to carry out the present invention, including logic controlling the integrated system and related components. Here, managing power generation and operation of a one- to five-person personal aerial vehicle (PAV) or other vehicle includes on-board equipment and integrated components such as a primary flight displays 12, an Automatic Dependent Surveillance-B (ADSB) or Remote ID transmitter/receiver 14, a global-positioning system (GPS) receiver typically embedded within 12, a fuel gauge 16, an air data computer to calculate airspeed and vertical speed 38, mission control tablet computers 36 and mission planning software 34, and redundant flight computers (also referred to as autopilot computers 32), all of which monitor either the operation and position of the air vehicle 1000 or monitor and control the hydrogen-powered fuel cell based power generation subsystem generating electricity and fuel supply subsystems 900 and provide display presentations that represent various aspects of those systems' operation and the air vehicle's 1000 state data, such as altitude, attitude, ground speed, position, local terrain, recommended flight path, weather data, remaining fuel and flying time, motor voltage and current status, intended destination, and other information necessary to a successful and safe flight. These presentations of data can be extended and augmented to improve user experience by networking said components to multifunction visual display nodes 72 comprising display elements 74 that may include light emitting diodes (LED), screens 80, 82 smart windows 84, audio output 85, augmented reality devices 86, and/or messaging 88 displays that are operated using one or more additional processors 76 and controllers 94 that can be controlled automatically, by the same onboard control units, remotely by networked devices or by user devices 78 that input control commands using user interfaces (UI) 90 that leverage available onboard internet connectivity. The fuel cell-based power generation subsystem combines stored hydrogen with compressed air to generate electricity with a byproduct of only water and heat, thereby forming a fuel cell module 18 that can also include pumps of various types and cooling system 44 and a turbocharger or supercharger 46 to optimize the efficiency and/or performance of the fuel cell module 18. As would be appreciated by one skilled in the art, the fuel cells may also be augmented by a battery (or supercapacitor, combination thereof or other energy storage system as understood by one of ordinary skill in the art) subsystem, consisting of high-voltage battery array, battery monitoring and charger subsystem or similar arrangements. This disclosure is meant to address both power generation systems and stored-energy battery systems, as well as hybrid systems incorporating both means of energy storage. For purposes of illustration, the present description focuses on a fuel cell form of electricity generation.

Figure 2:
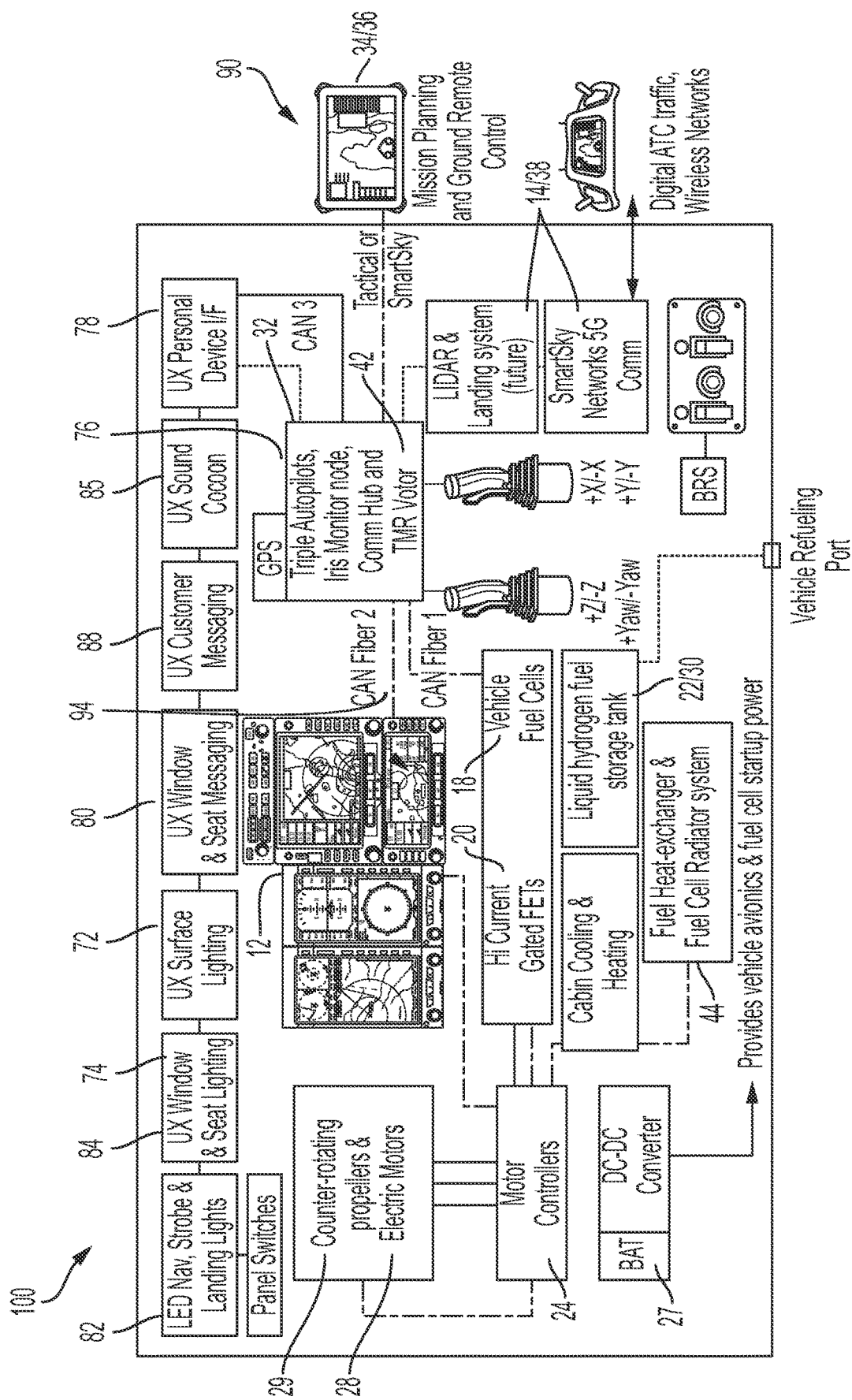
FIG. 2 depicts an example production system block diagram for practicing the present invention, including components and subsystems connected by CAN bus.

FIG. 2 depicts an example production version system block diagram for practicing the present invention, including electrical and systems connectivity for various control interfaces and components and subsystems connected by CAN bus to be individually commandable and interoperable so as to function autonomously or cooperatively to provide required functionalities in a vehicle including logic controlling the generation, distribution, adjustment and monitoring of electrical power (voltage and current). Components connected by CAN bus include customer or user experience messaging, sound cocoon, surface and ambience lighting, window and seat messaging, window and seat lighting, community screens, customer experience LED, LCD, NAV, strobe, landing lighting, wherein such components may be comprised of multifunction visual display nodes 72 with display elements 74 including screens 80; light emitting diodes (LED) 82; smart windows 84; augmented reality 86; messaging 88; audio output 85; operated by one or more processors 76 and controllers 94 automatically or in response to input from user interfaces (UI) 90 of user devices 78 present onboard. Vehicle state (pitch, bank, yaw, airspeed, vertical speed and altitude) are commanded a) by the operator using either a1) physical motions and commands made using the mission control tablet computers 36 as an input device; a2) physical motions and commands made using the sidearm controllers; or a3) physical motions and commands transmitted across secure digital or tactical datalinks or radio channels from a Ground-Remote Pilot; or a4) pre-planned mission routes selected and pre-programmed using the mission control tablet computers 36 and mission-planning software 34 in support of autonomous mode, or b) in UAV mode using pre-planned mission routes selected and pre-programmed using the mission control tablet computers 36 and mission-planning software 34 and uploaded to the onboard autopilot system prior to launch. The mission control tablet computer 36 may transmit the designated route or position command set to autopilot computers 32 and voter 42 over a serial, radio-control or similar datalink, and if so, the autopilot may then utilize that designated route or position command set (e.g. a set of altitudes and positions to form a route that is to be traveled from origin to destination). Depending on the equipment and protocols involved in the example embodiment, a sequence of commands may be sent using a repeating series of servo control pulses carrying the designated command information, represented by pulse-widths varying between 1.0 to 2.0 milliseconds contained within a 'frame' of, for example, 10 to 30 milliseconds). Multiple 'channels' of command data may be included within each 'frame', with the only caveat being that each maximum pulse width must have a period of no output (typically zero volts or logic zero) before the next channel's pulse can begin. In this way, multiple channels of command information are multiplexed onto a single serial pulse stream within each frame. The parameters for each pulse within the frame are that it has a minimum pulse width, a maximum pulse width, and a periodic repetition rate. The motor's RPM or torque is determined by the duration of the pulse that is applied to the control wire. Note that the motor's RPM is not determined by the duty cycle or repetition rate of the signal, but by the duration of the designated pulse. The autopilot might expect to see a pulse every 20 ms, although this can be shorter or longer, depending upon system 100 requirements. The width of each channel's pulse within the frame will determine how fast the corresponding motor turns. For example, anything less than a 1.2 ms pulse may be pre-programmed as 'Motor OFF' or 0 RPM (where a motor in the off state can be spun freely by a person, whereas a motor commanded to be at 0 RPM will be "locked" in that position), and pulse widths ranging from 1.2 ms up to 2.0 ms will proportionately command the motor from 20% RPM to 100% RPM. Given the physical constraints of the motor being controlled, the exact correlation between pulse width and resultant motor RPM will be a function of each system's programming. In another embodiment, motor commands may be transmitted digitally from the autopilot to the motor controllers 24 and status and/or feedback may be returned from the motor controllers 24 to the autopilot using a digital databus such as Ethernet or CAN (Controller Area Network), one of many available digital databusses capable of being applied, using RF or wire or fiber optics as the transmission medium. A modem (modulator-demodulator) may be implicitly present within the datalink device pair, so that the user sends Ethernet or CAN commands, the modem transforms said data into a format suitable for reliable transmission and reception across one or more channels, and the mating modem transforms that format back into the original Ethernet or CAN commands at the receiving node, for use within the autopilot system. As understood by a person of ordinary skill in the art, many possible embodiments are available to implement wireless data links between a tablet or ground pilot station and the vehicle, just as many possible embodiments are available to transmit and receive data and commands among the autopilot, the motor controllers 24, and the fuel cells and support devices that form the on-board power generation and motor controlling system.

The receiver at each autopilot then uses software algorithms to translate the received channel pulses correlating to channel commands from the tablet computer or alternate control means (in this example the set of pulse-widths representing the control inputs such as pitch, bank and yaw and rpm) into the necessary outputs to control each of the multiple (in this example six) node controllers 94, motor controllers 24, motors, and propellers 29 to achieve the commanded vehicle motions. Commands may be transmitted by direct wire, or over a secure RF (wireless) signal between transmitter and receiver, and may use an RC format, or may use direct digital data in Ethernet, CAN or another suitable protocol. The autopilot is also responsible for measuring other vehicle state information, such as pitch, bank angle, yaw, accelerations, and for maintaining vehicle stability using its own internal sensors and available data.

The command interface between the autopilots and the multiple motor controllers 24 will vary from one equipment set to another, and might entail such signal options to each motor controller 24 as a variable DC voltage, a variable resistance, a CAN, Ethernet or other serial network command, an RS-232 or other serial data command, or a PWM (pulse-width modulated) serial pulse stream, or other interface standard obvious to one skilled in the art. Control algorithms operating within the autopilot computer 32 perform the necessary state analysis, comparisons, and generate resultant commands to the individual motor controllers 24 and monitor the resulting vehicle state and stability. A voting means 42 decides which two of three autopilot computers 32 are in agreement, and automatically performs the voting operation to connect the proper autopilot computer 32 outputs to the corresponding motor controllers 24. For a redundant system 100, triple-redundant is the most common means of voting among inputs to detect a possible failure, but other levels of redundancy are also possible subject to meeting safety of flight requirements and regulations, and are obvious to one skilled in the art. Command interface and levels of redundancy are extended to operation of multifunction visual display nodes disposed throughout a vehicle, each individually controllable and individually communicating commands via cross communication channels or communication networks. Connecting these nodes in this manner allows each to function independently or according to coordinated configurations.

In a preferred control embodiment, the commanded vehicle motion and motor rpm commands could also be embodied by a pair of joysticks and a throttle, similar to those used to control radio-controlled air vehicle, or even by a pair of traditional sidearm controllers including a throttle, where the joysticks/sidearm controllers provide readings (which could be potentiometers, hall-effect sensors, or rotary-variable differential transformers (RVDT)) indicative of commanded motions which may then be translated into the appropriate message format and transmitted to the autopilot computers 32 by network commands or signals, and thereby used to control the multiple motor controllers 24, motors and propellers/rotors 29. The sidearm controller or joystick could also be embodied in a 'steering wheel' or control yoke capable of left-right and fore-aft motion, where the 2-axis joystick or control yoke provides two independent sets of single- or dual-redundant variable voltage or potentiometer settings indicative of pitch command (nose up or nose down) and bank command (left side up or left side down). Alternatively, instead of pitch and roll motions, the autopilot may also be capable of generating 'go left', 'go right' 'go forward' 'go backward', 'yaw left' or 'yaw right' commands, all while the autopilot is simultaneously maintaining the vehicle in a stable, level or approximately level state. This latter control means offers greater comfort for passenger(s) because it is similar to ground-based vehicle (e.g. automobile) motions than an air vehicle such as a winged air vehicle. Motors of the multiple motors and propellers 29 in the preferred embodiment are brushless synchronous three-phase AC or DC motors, capable of operating as an air vehicle motor, and that are either air-cooled or liquid cooled (by coolants including water, antifreeze, oil or other coolants understood by one of ordinary skill in the art) or both.

Throughout all of the system 100 operation, controlling and operating the vehicle is performed with the necessary safety, reliability, performance and redundancy measures required to protect human life to accepted flight-worthiness standards. Electrical energy to operate the vehicle is derived from the fuel cell modules 18, which provide voltage and current to the motor controllers 24 through optional high-current diodes or Field Effect Transistors (FETs) 20 and circuit breakers 902. High current contactors 904 or similar devices are engaged and disengaged under control of the vehicle key switch 40, similar to a car's ignition switch, which applies voltage to the starter/generator 26 to start the fuel cell modules 18 and produce electrical power. For example, the high current contactors 904 may be essentially large vacuum relays that are controlled by the vehicle key switch 40 and enable the current to flow to the starter/generator 26. In accordance with an example embodiment of the present invention, the starter/generator 26 also supplies power to the avionic systems of the air vehicle 1000. Once stable power is available, the motor controllers 24 each individually manage the necessary voltage and current to achieve the desired thrust by controlling the motor in either RPM mode or torque mode, to enable thrust to be produced by each motor and propeller/rotor combination 28. The number of motor controllers 24 and motor/propeller combinations 28 per vehicle may be as few as 4, and as many as 16 or more, depending upon vehicle architecture, desired payload (weight), fuel capacity, electric motor size, weight, and power, and vehicle structure. Advantageously, implementing a multirotor vehicle having a plurality of independent motor controllers 24 and motors, allows the use of smaller motors with lower current demands, such that fuel cells can produce the necessary voltage and current at a total weight for a functional aviation vehicle while achieving adequate flight durations, and allows the failure of one or more motors or motor controllers 24 to be compensated for by the autopilot to allow continued safe flight and landing in the event of said failure.

The fuel cells 18 are supplied by on-board fuel tanks 22. The ability to refuel the multirotor air vehicle 1000 fuel tanks 22 at the origin, at the destination, or at roadside refueling stations is fundamental to the vehicle's utility and acceptance by the commuting public. The ability to refuel the fuel tanks 22 to replace the energy source for the motors reduces the downtime required by conventional all electric vehicles (e.g., battery operated vehicles), which must be recharged from an external electricity source, which may be a time-consuming process. Fuel cells and fuel cell modules 18 can be powered by hydrogen. Accordingly, the fuel cell modules 18 can create electricity from fuel to provide power to the motors on the multirotor air vehicle 1000. Advantageously, the use of fuel cell modules 18 are more weight efficient than batteries and provide a greater energy density than existing Li ion batteries, thereby reducing the work required by the motors to produce lift. Additionally, the use of hydrogen fuel cells reduces the amount of work required by the motors due to the reduced weight as the fuel 30 is consumed.

Due to the nature of the all-electric vehicle, it is also possible to carry an on-board high-voltage battery and recharging subsystem in addition to fuel cell modules 18, with an external receptacle to facilitate recharging the on-board batteries. Power to operate the vehicle's avionics 12, 14, 16, 32, 34, 36, 38 and support lighting is provided by either a) a low-voltage starter-generator 26 powered by the fuel cell modules 18 and providing power to avionics battery 27, or b) a DC to DC Converter providing energy to Avionics Battery 27. If the DC to DC Converter is used, it draws power from high-voltage produced by the fuel cell modules 18 and down-converts the higher voltage, typically 300V DC to 600 VDC in this embodiment, to either 12V, 24V or 28V or other voltage standards, any of which are voltages typically used in small aircraft systems. Navigation, Strobe and Landing lights draw power from 26 and 27 and provide necessary air vehicle illumination for safety and operations at night under US and foreign airspace regulations. Suitable circuit breaker 902 and switch means are provided to control these ancillary lighting devices as part of the overall system 100. These devices are commonly implemented as Light Emitting Diode (LED) lights, and may be controlled either directly by one or more switches, or by a databus-controlled switch in response to a CAN or other digital databus command. If a CAN or databus command system is employed as shown in FIG. 1, then multiple 'user experience' or UX devices detailed above may also be employed, to provide enhanced user experience with such things as cabin lighting, seat lighting, window lighting, window messaging, sound cancellation or sound cocoon control, exterior surface lighting, exterior surface messaging or advertising, seat messaging, cabin-wide passenger instruction or in-flight messaging, passenger weight sensing, personal device (e.g. iPhone, tablet, iPad, (or Android or other device equivalents or similar personal digital devices) connectivity and charging, and other integrated features as may be added within the cabin or vehicle.

Pairs of motors for the multiple motors and propellers 29 are commanded to operate at different RPM or torque settings (determined by whether the autopilot is controlling the motors in RPM or torque mode) to produce slightly differing amounts of thrust under autopilot control, thus imparting a pitch moment, or a bank moment, or a yaw moment, or a change in altitude, or a lateral movement, or a longitudinal movement, or simultaneously any combination of the above to the air vehicle 1000, using position feedback from the autopilot's 6-axis built-in or remote inertial sensors to maintain stable flight attitude. Sensor data is read by each autopilot to assess its physical motion and rate of motion, which is then compared to commanded motion in all three dimensions to assess what new motion commands are required.

Of course, not all air vehicles will employ the same mix of avionics, instrumentation or controllers or motors, and some air vehicles will include equipment different from this mix or in addition to this mix. Not shown for example are radios as may be desirable for communications or other small ancillary avionics customary in general aviation aircraft of this size. Whatever the mix is, though, some set of equipment accepts input commands from an operator, translates those input commands into differing thrust amounts from the pairs of counter-rotating motors and propellers 29, and thus produces pitch, bank, yaw, and vertical motion of the air vehicle 1000, or lateral and longitudinal as well as and vertical and yaw motion of the air vehicle 1000, using differing commands to produce differential thrust from the electric motors operating propellers/rotors 29 in an assembly 28. Those same commands can be selectively communicated to user experience components including multifunction visual display nodes, that can trigger actuation or altering of display elements. When combined with avionics, instrumentation and display of the air vehicle's 1000 current and intended location, the set of equipment enables the operator, whether inside the vehicle, on the ground via datalink, or operating autonomously through assignment of a pre-planned route, to easily and safely operate and guide the air vehicle 1000 to its intended destination. It also allows users to easily access information about the progress of their journey, customize their experience, or receive additional information such as prompts when to fasten restraints in response to start up procedures or when it is safe to remove those restraints after arrival at an intended destination.

FIG. 2 includes motor and propeller combinations 28, propellers 29 primary flight displays 12, the Automatic Dependent Surveillance-B (ADSB) or Remote ID transmitter/receiver 14, autopilot computer 32, the mission control tablet computers 36 and mission-planning software 34. In each case, a mission control tablet computer or sidearm controllers may transmit the designated route or position command set or the intended motion to be achieved to autopilot computers 32 and voter 42 motor controllers 24, and air data computer to calculate airspeed and vertical speed 38. In some embodiments, fuel tank 22, the avionics battery 27, the pumps and cooling system 44, the turbocharger or supercharger 46, and a starter/alternator may also be included, monitored, and controlled. Any fuel cells 18 are fed by on-board fuel tank 22 and use the fuel to produce a source of power for the multirotor air vehicle 1000. These components are configured and integrated to work together with 4D Flight Management to auto generate and execute routes from minimal input, so a user doesn't need expertise to define proper route. These routes may be made available to customers through user experience screens linked to the relevant software and components. Full Envelope Protection has been developed and implemented so neither users nor environments can push the vehicle out of safe flight envelope and operating conditions. Envelope Protection offers a Safer System for protecting occupants, developed using wake vortex modeling, weather data, and precisely designed redundant algorithms incorporating the highest standards available for performance and safety. The goal is that there is nothing the vehicle, the human operator/supervisor/passenger, or the environment can do that would push the vehicle out of its safety envelope unless or until there is a failure in some aspect of the system. The motors in the preferred embodiment are brushless synchronous three-phase AC or DC motors, capable of operating as an aircraft motor, and that are air-cooled, liquid cooled or both. Motors and fuel cell modules 18 generate excess or waste heat from forces including electrical resistance and friction, and so this heat may be subject to management and thermal energy transfer. In one embodiment, the motors are connected to a separate cooling loop or circuit from the fuel cell modules 18. In another embodiment, the motors are connected to a shared cooling loop or circuit with the fuel cell modules 18.

The system 1000 implements pre-designed fault tolerance or graceful degradation that creates predictable behavior during anomalous conditions with respect to at least the following systems and components: 1) flight control hardware; 2) flight control software; 3) flight control testing; 4) motor control and power distribution subsystem; 5) motors; 6) fuel cell power generation subsystem; and 7) multiple, interoperable multifunction visual display nodes.

Flight control hardware may comprise, for example, a redundant set of Pixhawk or other flight controllers with 32-bit, 64-bit or greater ARM processors (or other suitable processor known in the art, wherein certain embodiments may employ no processor and instead use an FPGA or similar devices known in the art). The vehicle may be configured with multiple flight controllers, where certain example embodiments employ at least three (3) Pixhawk autopilots disposed inside the vehicle for redundancy. Each autopilot comprises: three (3) Accelerometers, three (3) gyros, three (3) magnetometers, two (2) barometers, and at least one (1) GPS device, although the exact combinations and configurations of hardware and software devices may vary. Sensor combining and voting algorithms internal to each autopilot select the best value from each sensor type and handle switchovers/sensor failures within each autopilot. Flight control software may comprise at least one PID style algorithm that has been developed using: 1) CAD data; 2) FEA data; and 3) actual propeller/motor/motor controller/fuel cell performance data measurements.

An example embodiment is shown for the vehicle's 6 motors, with each motor controlled by a dedicated motor controller 24. Electrical operating characteristics/data for each motor are controlled and communicated to the voting system for analysis and decision making Communication to the motor controllers 24 happens (in this embodiment) between autopilot and motor controller 24 via CAN, a digital network protocol, with fiber optic transceivers inline to protect signal integrity and provide electromagnetic and lightning immunity. In this embodiment, the use of fiber optics, sometimes known as 'Fly By Light' increases vehicle reliability and reduces any vulnerability to ground differentials, voltage differentials, electromagnetic interference, lighting, and external sources of electromagnetic interference, such as TV or radio broadcast towers, airport radars, airborne radars, and similar potential disturbances. Other instances of networks and electrical or optical or wireless media are possible as well, subject to meeting regulatory requirements. Measured parameters related to motor performance include motor temperature, IGBT temperature, voltage, current, torque, and revolutions per minute (RPM). Values for these parameters in turn correlate to the thrust expected under given atmospheric, power and pitch conditions.

The fuel cell control system may have various numbers of fuel cells based on the particular use configuration, for example a set of three hydrogen fuel cells configured for fault-tolerance. Operation and control of the cells is enabled and managed using the CAN protocol, although numerous other databus and control techniques are possible and will be obvious to one skilled in the art. One or more flight control algorithms stored within the autopilot will control and monitor the power delivered by the fuel cells via CAN. The triple-modular redundant autopilot can detect the loss of any one fuel cell and reconfigure the remaining fuel cells using a form of automatic switching or cross connection, thus ensuring that the fuel cell system is capable of continuing to operate the air vehicle 1000 to perform a safe descent and landing. When the operating parameters are exceeded past a significant extent or preset limit, or emergency conditions exist such that a safe landing is jeopardized, the integrated emergency procedures are activated, and the deployment of an inter-rotor ballistic airframe parachute will be triggered.

The autopilot computer 32 is embodied in a microprocessor-based circuit and includes the various interface circuits required to communicate with the air vehicle's 1000 data busses, multi-channel servo or network controllers (inputs) 35 and 37, and motor controller (outputs) 24, and to take inertial and attitude measurements to maintain stability. This is further detailed in FIG. 3, which depicts an example block diagram detailing the key features of the redundant, fault-tolerant, multiple-redundant voting control and communications means and autopilot control unit 32 in relation to the overall system. In addition, autopilot computer 32 may also be configured for automatic recording or reporting of air vehicle position, air vehicle state data, velocity, altitude, pitch angle, bank angle, thrust, location, and other parameters typical of capturing air vehicle position and performance, for later analysis or playback. Additionally, recorded data may be duplicated and sent to another computer or device that is fire and crash proof. To accomplish these requirements, said autopilot contains an embedded air data computer (ADC) and embedded inertial measurement sensors, although these data could also be derived from small, separate stand-alone units. The autopilot may be operated as a single, dual, quad, or other controller, but for reliability and safety purposes, the preferred embodiment uses a triple redundant autopilot, where the units share information, decisions and intended commands in a co-operative relationship using one or more networks (two are preferred, for reliability and availability). In the event of a serious disagreement outside of allowable guard-bands, and assuming three units are present, a 2-out-of-3 vote determines the command to be implemented by the motor controllers 24, and the appropriate commands are automatically selected and transmitted to the motor controllers 24. Similarly, a subset of hardware monitors the condition of the network, a CAN bus in an example embodiment, to determine whether a bus jam or other malfunction has occurred at the physical level, in which case automatic switchover to the reversionary CAN bus occurs. The operator is not typically notified of the controller disagreement during flight, but the result will be logged so that the units may be scheduled for further diagnostics post-flight.

The mission control tablet computer 36 is typically a single or a dual redundant implementation, where each mission control tablet computer 36 contains identical hardware and software, and a screen button designating that unit as 'Primary' or 'Backup'. The primary unit is used in all cases unless it has failed, whereby either the operator (if present) must select the 'Backup' unit through a touch icon, or an automatic fail-over will select the Backup unit when the autopilots detect a failure of the Primary. When operating without a formal pre-programmed route, the mission control tablet computer 36 uses its internal motion sensors to assess the operator's intent and transmits the desired motion commands to the autopilot. When operating without a mission planning computer or tablet, the autopilots receive their commands from the connected pair of joysticks or sidearm controllers. In UAV mode, or in manned automatic mode, the mission planning software 34 will be used pre-flight to designate a route, destination, and altitude profile for the air vehicle 1000 to fly, forming the flight plan for that flight. Flight plans, if entered into the Primary mission control tablet computer 36, are automatically sent to the corresponding autopilot, and the autopilots automatically cross-fill the flight plan details between themselves and the Backup mission control tablet computer 36, so that each autopilot computer 32 and mission control tablet computer 36 carries the same mission commands and intended route. In the event that the Primary tablet fails, the Backup tablet already contains the same flight details, and assumes control of the flight once selected either by operator action or automatic fail-over.

For motor control of the multiple motors and propellers 29, there are three phases that connect from each high-current controller to each motor for a synchronous AC or DC brushless motor. Reversing the position of any two of the 3 phases will cause the motor to run the opposite direction. There is alternately a software setting within the motor controller 24 that allows the same effect, but it is preferred to hard-wire it, since the designated motors running in the opposite direction must also have propellers with a reversed pitch (these are sometimes referred to as left-hand vs right-hand pitch, or puller (normal) vs pusher (reversed) pitch propellers, thereby forming the multiple motors and propellers 29. Operating the motors in counter-rotating pairs cancels out the rotational torque that would otherwise be trying to spin the vehicle.

In the illustrated embodiment, the operational analyses and control algorithms described herein are performed by the on-board autopilot computer 32, and flight path and other useful data are presented on the avionics displays 12. Various aspects of the invention can be practiced with a different division of labor; some or all of the position and control instructions can in principle be performed outside the air vehicle 1000, in ground-based equipment, by using a broadband or 802.11 Wi-Fi network or Radio Frequency (RF) datalink or tactical datalink mesh network or similar between the air vehicle 1000 and the ground-based equipment.

The combination of the avionics display system coupled with the ADSB capability enables the multirotor air vehicle 1000 to receive broadcast data from other nearby aircraft, and to thereby allow the multirotor air vehicle 1000 to avoid close encounters with other aircraft; to broadcast own-aircraft position data to avoid close encounters with other cooperating aircraft; to receive weather data for display to the pilot and for use by the avionics display system within the multirotor air vehicle 1000; to allow operation of the multirotor air vehicle 1000 with little or no requirement to interact with or communicate with air traffic controllers; and to perform calculations for flight path optimization, based upon own-aircraft state, cooperating aircraft state, and available flight path dynamics under the National Airspace System, and thus achieve optimal or near-optimal flight path from origin to destination.

Figure 3:
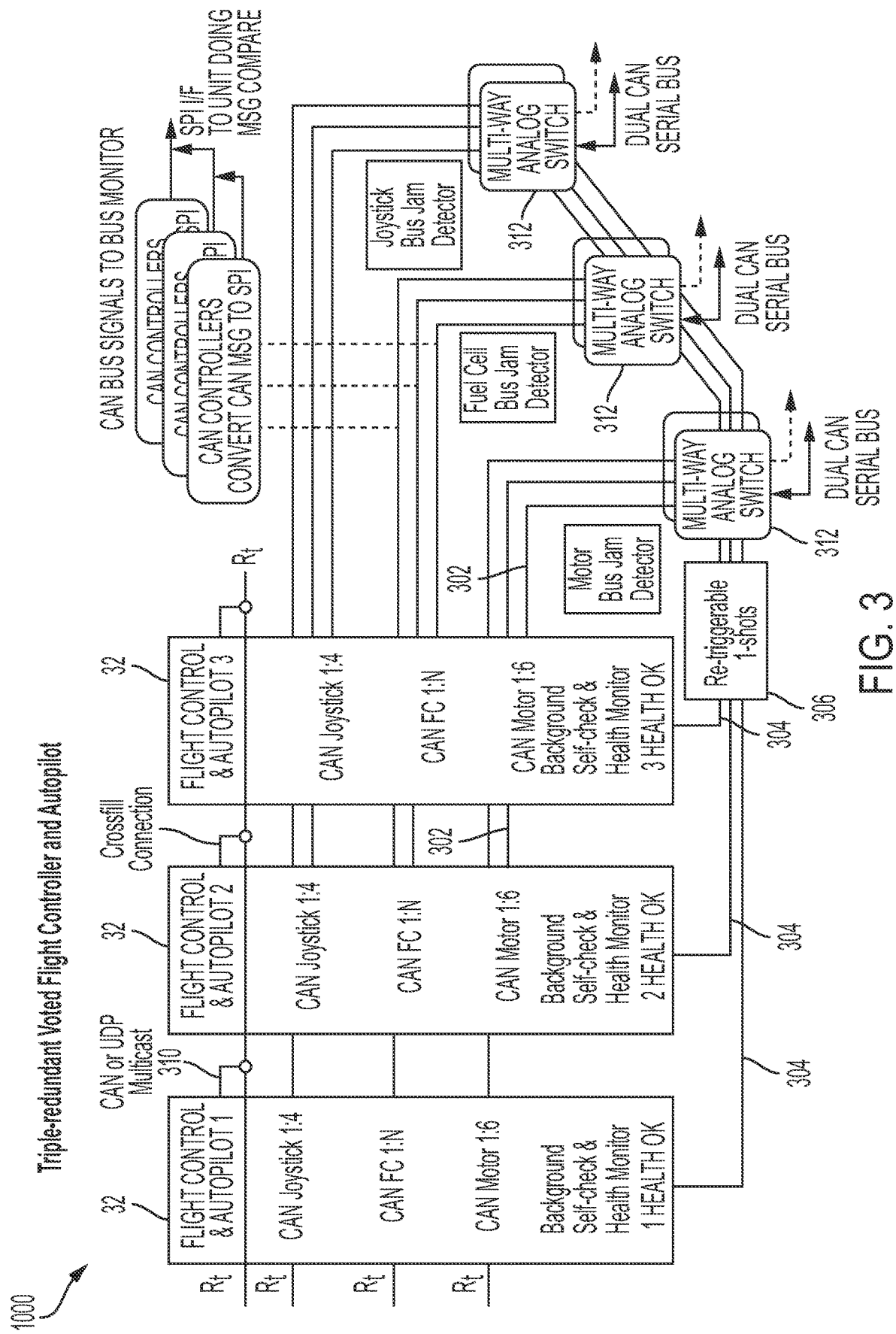
FIG. 3 depicts an example block diagram, focused on an example fault-tolerant, triple-redundant voting control and communications means.

FIG. 3 depicts a more detailed example block diagram, showing the voting process that is implemented with the fault-tolerant, triple-redundant voting control and communications means to perform the qualitative decision process. Since there is no one concise 'right answer' in this real-time system, the autopilot computers 32 instead share flight plan data and the desired parameters for operating the flight by cross-filling the flight plan, and each measures its own state-space variables that define the current air vehicle 1000 state, and the health of each Node. Each node independently produces a set of motor control outputs (in serial CAN bus message format in the described embodiment), and each node assesses its own internal health status. The results of the health-status assessment are then used to automatically select which of the autopilots actually are in control of the motors of the multiple motors and propellers 29. In an example embodiment, the voting process is guided by the following rules: 1) Each autopilot node (AP) 32 asserts "node ok" 304 when its internal health is good, at the start of each message. Messages occur each update period, and provide shared communications between AP's; 2) Each AP de-asserts "node ok" if it detects an internal failure, or its internal watchdog timer expires (indicating AP or software failure), or it fails background self-test; 3) Each AP's "node ok" signal must pulse at least once per time interval to retrigger a 1-shot 'watchdog' timer 306; 4) If the AP's health bit does not pulse, the watchdog times out and the AP is considered invalid; 5) Each AP connects to the other two AP's over a dual redundant, multi-transmitter bus 310 (this may be a CAN network, or an RS-422/423 serial network, or an Ethernet network, or similar means of allowing multiple nodes to communicate); 6) The AP's determine which is the primary AP based on which is communicating with the cockpit primary tablet; 7) The primary AP receives flight plan data or flight commands from the primary tablet; 8) The AP's then cross-fill flight plan data and waypoint data between themselves using the dual redundant network 310 (this assures each autopilot (AP) knows the mission or command parameters as if it had received them from the tablet); 9) In the cockpit, the backup tablet receives a copy of the flight plan data or flight commands from its cross-filed AP; 10) Each AP then monitors air vehicle 1000 state vs commanded state to ensure the primary AP is working, within an acceptable tolerance or guard-band range (where results are shared between AP's using the dual redundant network 310); 11) Motor output commands are issued using the PWM motor control serial signals, in this embodiment (other embodiments have also been described but are not dealt with in detail here) and outputs from each AP pass through the voter 312 before being presented to each motor controller 24; 12) If an AP de-asserts its health bit or fails to retrigger its watchdog timer, the AP is considered invalid and the voter 312 automatically selects a different AP to control the flight based on the voting table; 13) The new AP assumes control of vehicle state and issues motor commands to the voter 312 as before; 14) Each AP maintains a health-status state table for its companion AP's (if an AP fails to communicate, it is logged as inoperative, and the remaining AP's update their state table and will no longer accept or expect input from the failed or failing AP); 15) Qualitative analysis is also monitored by the AP's that are not presently in command or by an independent monitor node; 16) Each AP maintains its own state table plus 2 other state tables and an allowable deviation table; 17) The network master issues a new frame to the other AP's at a periodic rate, and then publishes its latest state data; 18) Each AP must publish its results to the other AP's within a programmable delay after seeing the message frame, or be declared invalid; and 19) If the message frame is not received after a programmable delay, node 2 assumes network master role and sends a message to node 1 to end its master role. Note that the redundant communication systems are provided in order to permit the system to survive a single fault with no degradation of system operations or safety. More than a single fault initiates emergency system implementation, wherein based on the number of faults and fault type, the emergency deceleration and descent system may be engaged to release an inter-rotor ballistic parachute. Upon detection of such faults, the triggering of emergency procedures also triggers altering of display elements 74 to present warnings, alerts, alarms, emergency procedures, emergency guidance and/or emergency instructions to users, including by altering ambient lighting to appropriate displays in emergency scenarios.

Multi-way voter implemented using analog switch 312 monitors the state of 1.OK, 2.OK and 3.OK and uses those 3 signals to determine which serial signal set 302 to enable so that motor control messages may pass between the controlling node and the motor controllers 24, fuel cell messages may pass between the controlling node and the fuel cells, and joystick messages may pass between the controlling node and the joysticks. This controller serial bus is typified by a CAN network in the preferred embodiment, although other serial communications may be used such as PWM pulse trains, RS-232, Ethernet, or a similar communication means. In an alternate embodiment, the PWM pulse train is employed; with the width of the PWM pulse on each channel being used to designate the percent of RPM that the motor controller 24 should achieve. This enables the controlling node to issue commands to each motor controller 24 on the network. Through voting and signal switching, the multiple (typically one per motor plus one each for any other servo systems) command stream outputs from the three autopilot computers can be voted to produce a single set of multiple command streams, using the system's knowledge of each autopilot's internal health and status. The system can include voted bidirectional multiplexor electrical signal management that some example embodiments of the invention may employ. The system 100 provides sensing devices or safety sensors that monitor the various subsystems, and including the at least one fuel cell module and the plurality of motor controllers, each configured to self-measure and report parameters using a Controller Area Network (CAN) bus to inform the one or more autopilot control units 32 or computer units (CPUs) as to a valve, pump or combination thereof to enable to increase or decrease of fuel supply or cooling using fluids wherein thermal energy is transferred from the coolant, wherein the one or more autopilot control units 32 comprise at least two redundant autopilot control units that command the plurality of motor controllers 24, the fuel supply subsystem, the at least one fuel cell module 18, and fluid control units with commands operating valves and pumps altering flows of fuel, air and coolant to different locations, and wherein the at least two redundant autopilot control units 32 communicate a voting process over a redundant network where the at least two redundant autopilot control units 32 with CPUs provide health status indicators (e.g. an "I'm OK" signal triggered periodically). The signals and analog voting circuit compute the overall health of e.g. fuel cell modules by determining from the individual health status indicators whether all nodes are good, a particular node is experiencing a fault, a series of fault are experienced, or the system is inoperative (or other similar indications based on aggregation of individual signals and cross check verification). Results of voting then trigger appropriate signals sent to control e.g. fuel cell modules 18 or motor controllers 24.

Figure 4:
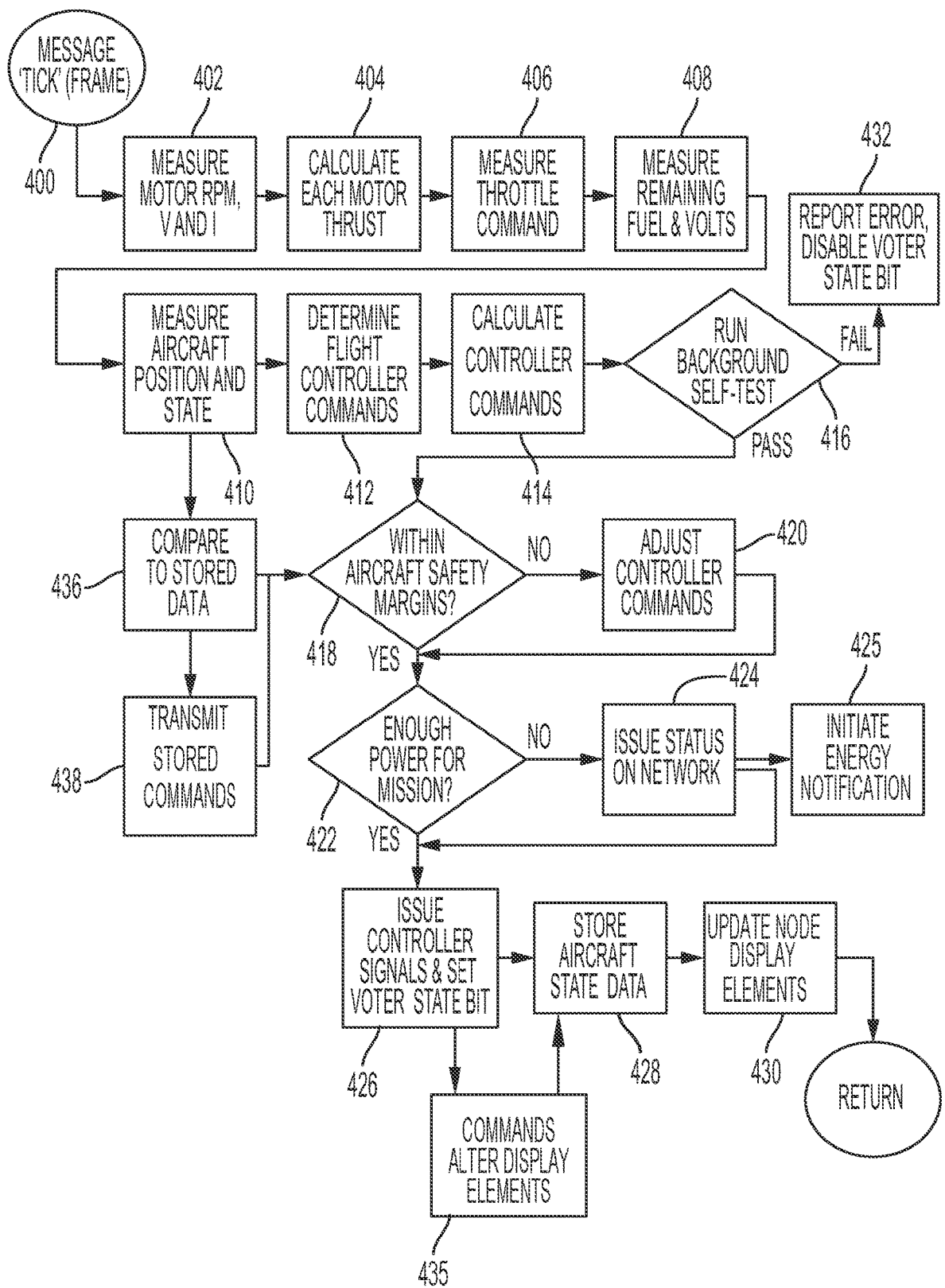
FIG. 4 depicts a flow chart that illustrates the present invention in accordance with one example embodiment.

FIG. 4 depicts a flowchart that illustrates in simplified form a measurement-analysis-adjustment-control approach that some example embodiments of the invention may employ. The system enters the routine 400 periodically, at every "tick" of a periodic system frame as initiated by the controlling AP via an output message. The frequency at which this occurs is selected to be appropriate to the parameters being sensed and the flight dynamics of the vehicle, and in some cases the frequencies may be different for different measurements. For the sake of simplicity, though, the frequency is the same for all of them, and, for the sake of concreteness, an oversampling frequency of forty times per second or every 25 milliseconds, more or less, is applied.

At block 402, the system first takes measurements of various sensor outputs indicative of each motor's performance of the multiple motors and propellers 29, including propeller RPM, motor voltage, motor current and (if available) temperature or similar thermodynamic operating conditions. Such measurement data may be readily accessed through each motor controller's 24 serial data busses, and the illustrated embodiment selects among the various available measurement parameters that can be obtained in this manner.

With the motor data thus taken, the system performs various analyses, as at block 404, which may be used to calculate each motor's thrust and contribution to vehicle lift and attitude. Block 406 then measures the throttle command, by detecting where the tablet throttle command or throttle lever has been positioned by the operator and notes any change in commanded thrust from prior samples.

Block 408 measures the voltage, current drawn and estimated remaining fuel 30. This data is then used as part of the analysis of remaining flight duration for the trip or mission underway and is made available to the operator.

At block 410, the autopilot computer 32 gathers a representative group of air vehicle 1000 measurements from other embedded inertial sensors and (optionally) other onboard sensors including air data sensors, and GPS data derived by receiving data from embedded GPS receivers. Such measurements may include air speed, vertical speed, pressure altitude, GPS altitude, GPS latitude and GPS longitude, outside-air temperature (OAT), pitch angle, bank angle, yaw angle, pitch rate, bank rate, yaw rate, longitudinal acceleration, lateral acceleration, and vertical acceleration. For some of the parameters, there are predetermined limits with which the system compares the measured values. This data may be used to determine thermodynamic operating conditions and is made available to the operator. These may be limits on the values themselves and/or limits in the amount of change since the last reading or from some average of the past few readings. Limits may be related to thermal references derived from thermodynamics, components, settings, parameters, and operating conditions. Block 412 then measures the tablet flight controller or sidearm controller command, by detecting where the tablet or sidearm units have been positioned by the operator in space and notes any change in commanded position from prior samples. If operating in pre-planned (UAV) mode, Block 412 assesses the next required step in the pre-planned mission previously loaded to the autopilot control unit 32.

Block 414 then assimilates all of the vehicle state data and commanded data from the operator and calculates the intended matrix of motor controller 24 adjustments necessary to accommodate the desired motions. Block 416 then executes the background health-status tests and passes the command matrix on to block 418. If the background health-status test fails, Block 416 reports the error, and disables the voter 312 output state bit at Block 432. If the test itself cannot be run, the voter 312 output state bit(s) will cease to pulse, and the external watchdog will declare the failure of that controller, allowing another to take over through the external voter 312 action.

Block 418 in turn examines the intended matrix of commands and assesses whether the intended actions are within the air vehicle's 1000 safety margins. For example, if motor controller 3 is being commanded to output a certain current, is that current within the approved performance metrics for this air vehicle 1000. If not, block 420 makes adjustments to the matrix of motor controller 24 commands and provides an indication to the Display to indicate that vehicle performance has been adjusted or constrained.

Similarly, Block 422 examines the intended matrix of commands, and assesses whether the electrical system and fuel tank 22 contain sufficient power to accomplish the mission with margins and without compromising the overall success of the mission. For example, if all motor controllers 24 are being commanded to output a higher current to increase altitude, is that current available and can this be done without compromising the overall success of the mission. If not, block 424 makes adjustments to the matrix of motor controller 24 commands and provides an indication to the Display to indicate that vehicle performance has been adjusted or constrained. Block 424 then issues network messages to indicate its actions and status to the other autopilot nodes.

If actions of the nodes are detected to not be capable of correcting a status of a number of nodes sufficient to prevent the air vehicle 1000 from exceeding safe flight envelope parameters or maintaining flight stability, Block 425 then issues commands to the motor controllers 24 to initiate emergency procedures that may include emergency notifications, messages, or instructions, as well as display elements presenting warnings or alert visuals, and monitors their responses for correctness. Otherwise, Block 426 then issues the commands to the controllers 24 and monitors their responses for correctness in altering display elements. Block 435 alters particular properties or functions of display elements of the multifunction visual display nodes, for example, by adjusting a brightness or color of an LED or LCD lighting a seating area or advancing to a different screen while browsing menu items on an onboard GUI.

Block 428 then captures all of the available air vehicle performance and state data, and determines whether it is time to store an update sample to a non-volatile data storage device, typically a flash memory device or other form of permanent data storage. Typically, samples are stored once per second, so the system need not perform the storage operation at every 100 millisecond sample opportunity.

Block 430 then provides any necessary updates to the one or more multifunction visual display nodes and display elements, presenting the interactive environment to the user inside the vehicle and returns to await the next tick, when the entire sequence is repeated.

Block 436 assimilates all of the vehicle state data, particularly thermodynamic operating conditions in the form of measured temperature states or measured thermal energy states retrieved from various temperature sensors and thermal energy sensors and commanded data from the operator, then calculates the adjustments necessary to update display elements within the air vehicle 1000 by comparing analyzed data or sensor output to stored information and data that indicates default data to provide or commands to execute based on operating conditions falling within certain thresholds, while also customizing data according to relevant stored user data provided by the user account or user device (e.g. directing a message to a user by indicating a stored name of a user accessed from a user data store in local or remote data storage devices). Block 438 executes the transmission or transfer of stored data, commands and parameters to vehicle systems to efficiently provide additional messages or displays based on transmitted vehicle operating conditions, and vehicle state data is updated reflecting the resulting adjusted thermodynamic operating conditions. Block 418 in turn examines the intended matrix of commands and assesses whether the intended actions are within the air vehicle's 1000 safety margins. If not, block 420 makes adjustments to the commands Progressing back through the steps, Block 430 then provides any necessary updates to the operator Display, and returns to await the next tick, when the entire sequence is repeated.

When the flight is complete, the operator or his maintenance mechanic can then tap into the recorded data and display it or play it back in a variety of presentation formats. One approach would be for the onboard display apparatus to take the form of computers so programmed as to acquire the recorded data, determine the styles of display appropriate to the various parameters, provide the user a list of views among which to select for reviewing or playing back (simulating) the data, and displaying the data in accordance with those views. However, although the illustrated embodiment does not rely on ground apparatus to provide the display, this could also be accomplished by an off-board or ground display or remote server system. The system does so by utilizing a so-called client-server approach where the onboard apparatus (data server) prepares and provides web pages; the ground display apparatus requires only a standard web-browser client to provide the desired user interface.

In regard to stored or acquired flight data records, in addition to providing a browser-based communications mode, the on-board recording system also enables stored data from one or more flights to be read in other ways. For example, the on-board storage may also be examined and/or downloaded using a web server interface or transmitted to a ground station using tactical datalinks, commercial telecom (i.e. 4G, 5G or similar), Wi-Fi, or Satellite (SatCom) services such as Iridium. Typically, but not necessarily, the on-board storage contains the data in a comma-delimited or other simple file format easily read by employing standard techniques.

The present invention's approach to multirotor vehicle operation and control, coupled with its onboard equipment for measuring, analyzing, displaying and predicting motor and controller items that can be adjusted, and for calculating whether the commanded motion is safe and within the vehicle's capabilities, can significantly enhance the safety and utility of this novel air vehicle design, and reduce the probability of a novice operator attempting to operate outside of the vehicle's normal operational limits. It therefore constitutes a significant advance in the art. Similarly, the ability of the vehicle to operate with redundant motor capacity, redundant fuel cell capability, and to be operated by a triple-redundant autopilot and the use of 'Fly By Light' techniques originated by the inventor, significantly enhances the safety and utility of this novel air vehicle design, and protects the operator or payload from possibly catastrophic occurrences due to a system failure, motor failure, fuel cell failure, or external EMI or lightning interference. The design is such that any single failure of a motor, controller, or autopilot or tablet is or sidearm controller managed and circumvented, to ensure the safe continued operation and landing of the vehicle.

Figure 5:
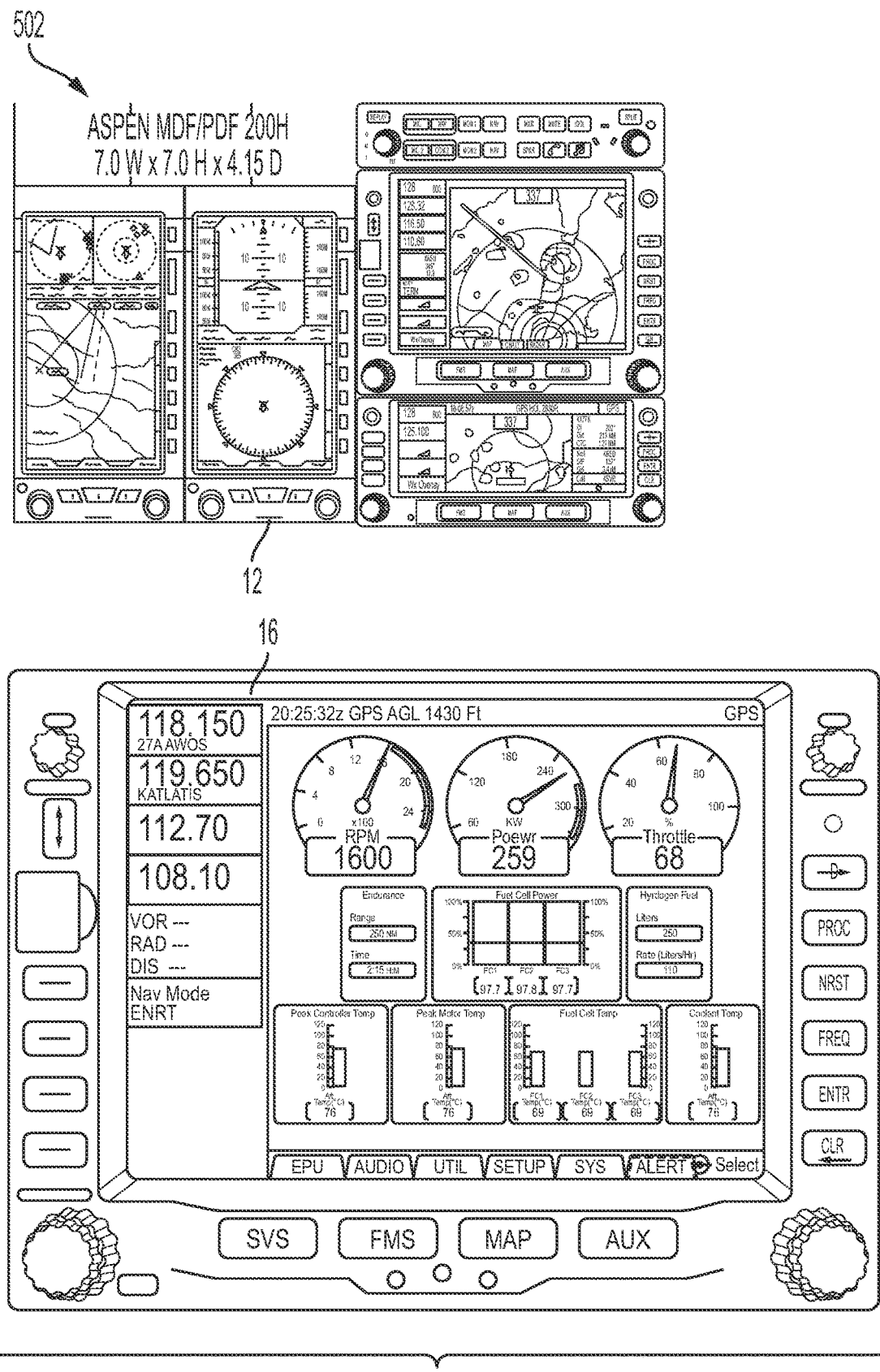
FIG. 5 depicts an example of control panels, gauges and sensor output for the multirotor air vehicle.

FIG. 5 depicts an example of control panels, gauges and sensor output for a multirotor air vehicle including one kind of display presentation 502 that can be provided to show fuel cell operating conditions including fuel remaining, fuel cell temperature and motor performance related to each of the respective fuel cell modules 18 (bottom) as well as weather data (in the right half) and highway in the sky data (in the left half). Also shown are the vehicle's GPS airspeed (upper left vertical bar) and GPS altitude (upper right vertical bar). Magnetic heading, bank and pitch are also displayed, to present the operator with a comprehensive, 3-dimensional representation of where the air vehicle 1000 is, how it is being operated, and where it is headed. Other screens can be selected from a touch-sensitive row of buttons along the lower portion of the screen. In certain embodiments, display presentation 502 has added wickets to guide the pilot along the flight path. Each display contains data that can be automatically made available to screens 80 comprising display elements 74 corresponding to multifunction visual display nodes 72 or can be accessed by user device based on identification by the system 100. Certain information can also be restricted from such availability. The lower half of the screen illustrates nearby landing sites that can readily be reached by the vehicle with the amount of power on board. In an example embodiment directed to near implementation, FIG. 5 shows the use of available TSO'd (i.e. FAA approved) avionics units, adapted to this vehicle and mission. Subject to approval by FAA or international authorities, a simpler form of avionics (known as Simplified Vehicle Operations or SVO) may be introduced, where said display is notionally a software package installed and operating on a 'tablet' or simplified computer and display, similar to an Apple iPad®. The use of two identical units running identical display software allows the user to configure several different display presentations, and yet still have full capability in the event that one display should fail during a flight. This enhances the vehicle's overall safety and reliability.

Figure 6:
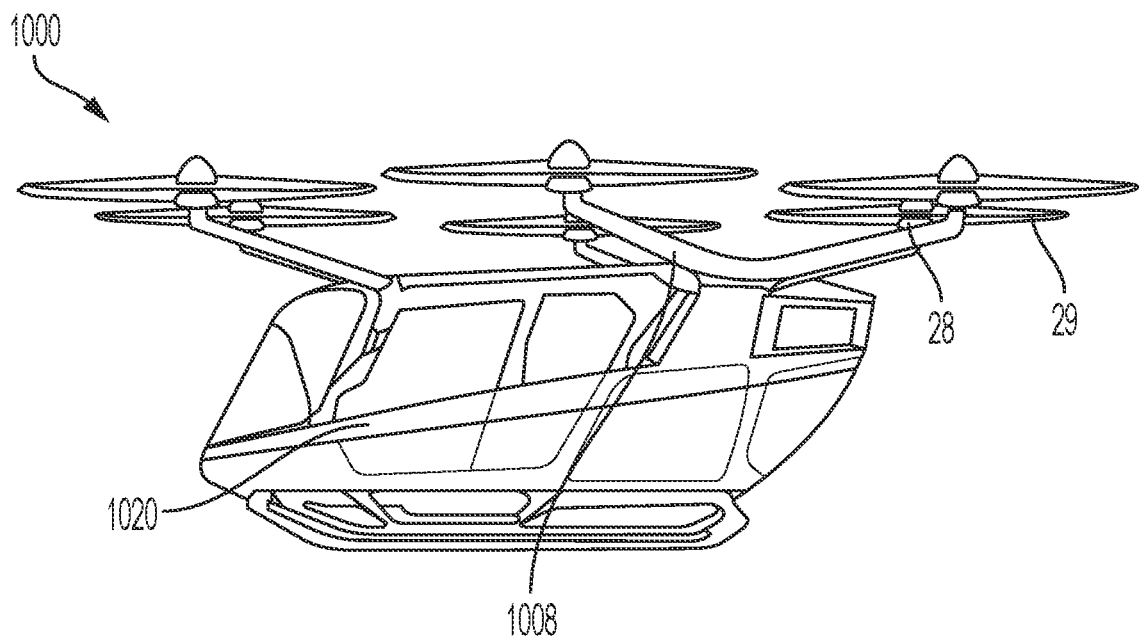
FIG. 6 depicts example side and top views of a multirotor air vehicle with six rotors cantilevered from the frame of the multirotor air vehicle in accordance with an embodiment of the present invention, indicating the location and compartments housing the fuel supply and power generation subsystems; electrical and systems connectivity of various fuel supply, power generation, and motor control components of a system of the invention.
Figure 6:
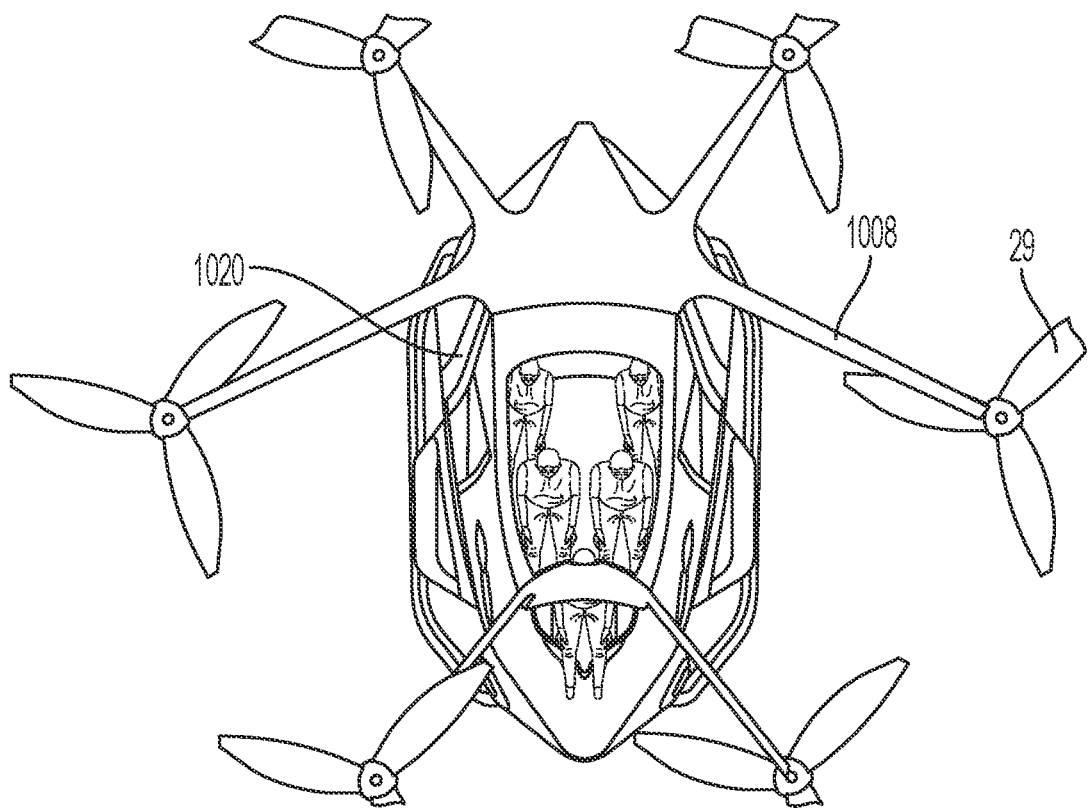

FIG. 6 depicts side and top views of a multirotor air vehicle with six rotors cantilevered from the air frame of the multirotor air vehicle 1000 in accordance with an embodiment of the present invention, indicating the location and compartments housing various fuel supply, power generation, and motor control components of a system of the invention. Disposed throughout the components and surfaces of the air vehicle are various multifunction visual display nodes 72 comprising display elements 74 operated by one or more processing devices 76, controllers 94, and/or user devices 78 to provide user interfaces (UI) 90, light emitting diodes (LED) 82, smart windows 84, augmented reality 86 displays, audio output, screens 80 and/or messaging 88 to enhance user experience and provide required data and information.

In accordance with an example embodiment of the present invention, the multiple electric motors are supported by the elongate support arms 1008, and when the air vehicle 1000 is elevated, the elongate support arms 1008 support (in suspension) the air vehicle 1000 itself. FIG. 6 depicts side and top views of a multirotor air vehicle 1000 with six rotors (propellers 29) cantilevered from the frame of the multirotor air vehicle 1020 in accordance with an embodiment of the present invention, indicating the location of the airframe fuselage 1020, attached to which are the elongate support arms 1008 that support the plurality of motor and propeller assemblies 28 wherein the propellers 29 are clearly shown. Lighting networked by multifunction visual display nodes 72 comprising display elements 74 is shown.

Figure 7:
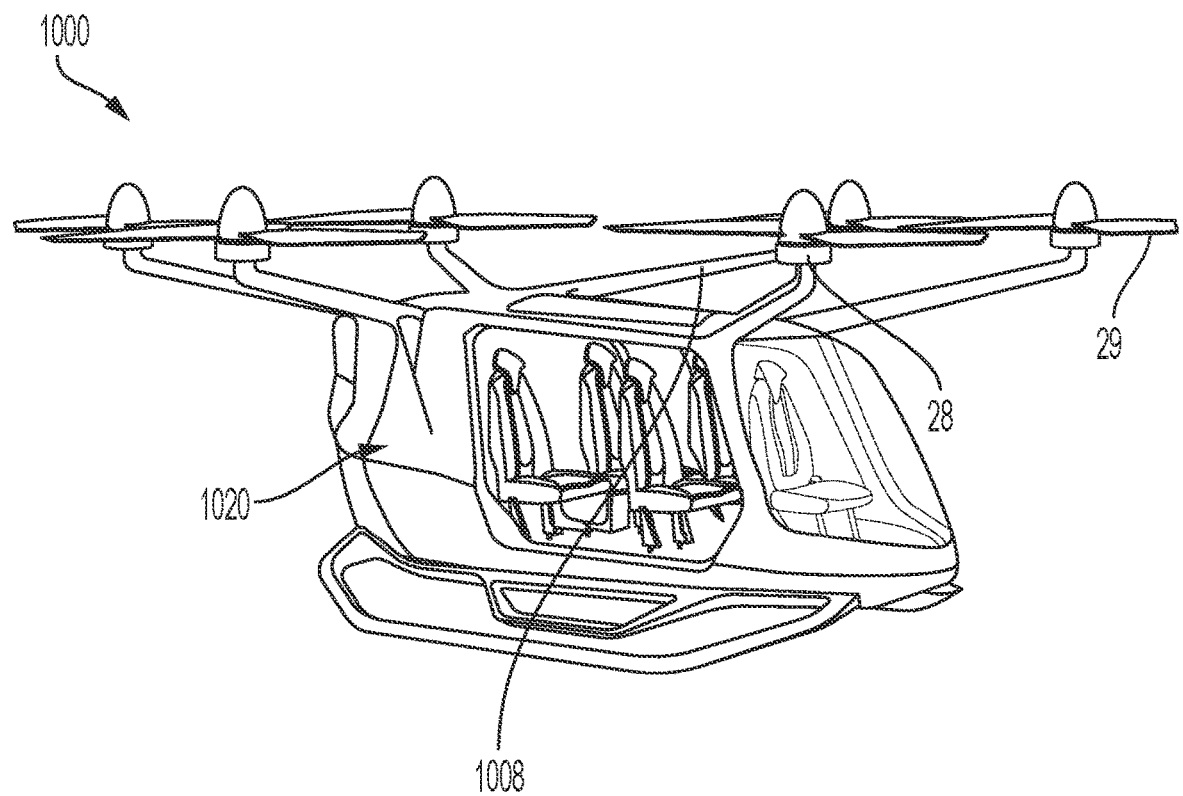
FIG. 7 depicts two example views of the multirotor air vehicle demonstrating the position and compartments housing system elements including dynamic lighting elements.
Figure 7:
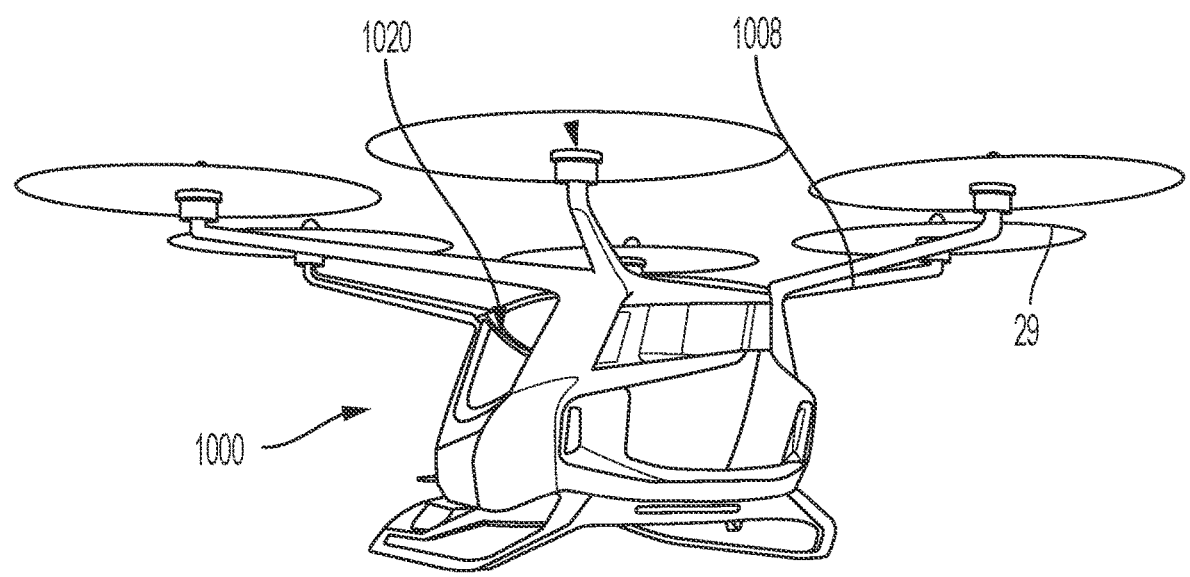

FIG. 7 depicts two example views of the multirotor air vehicle demonstrating the position and compartments housing system elements including lighting networked by multifunction visual display nodes 72 comprising display elements 74. Multifunction visual display nodes 72; display elements 74; processor 76; user devices 78; screens 80; FIG. 7 depicts two views demonstrating the position of the array of propellers 29 extending from the frame of the multirotor air vehicle airframe fuselage 1020 and elongates support arms 1008 with an approximately annular configuration, whereby onboard sensors can be deployed in an array to provide output that triggers commands to the multifunction visual display nodes 72 altering display elements 74 automatically according to pre-set parameters.

Figure 8:
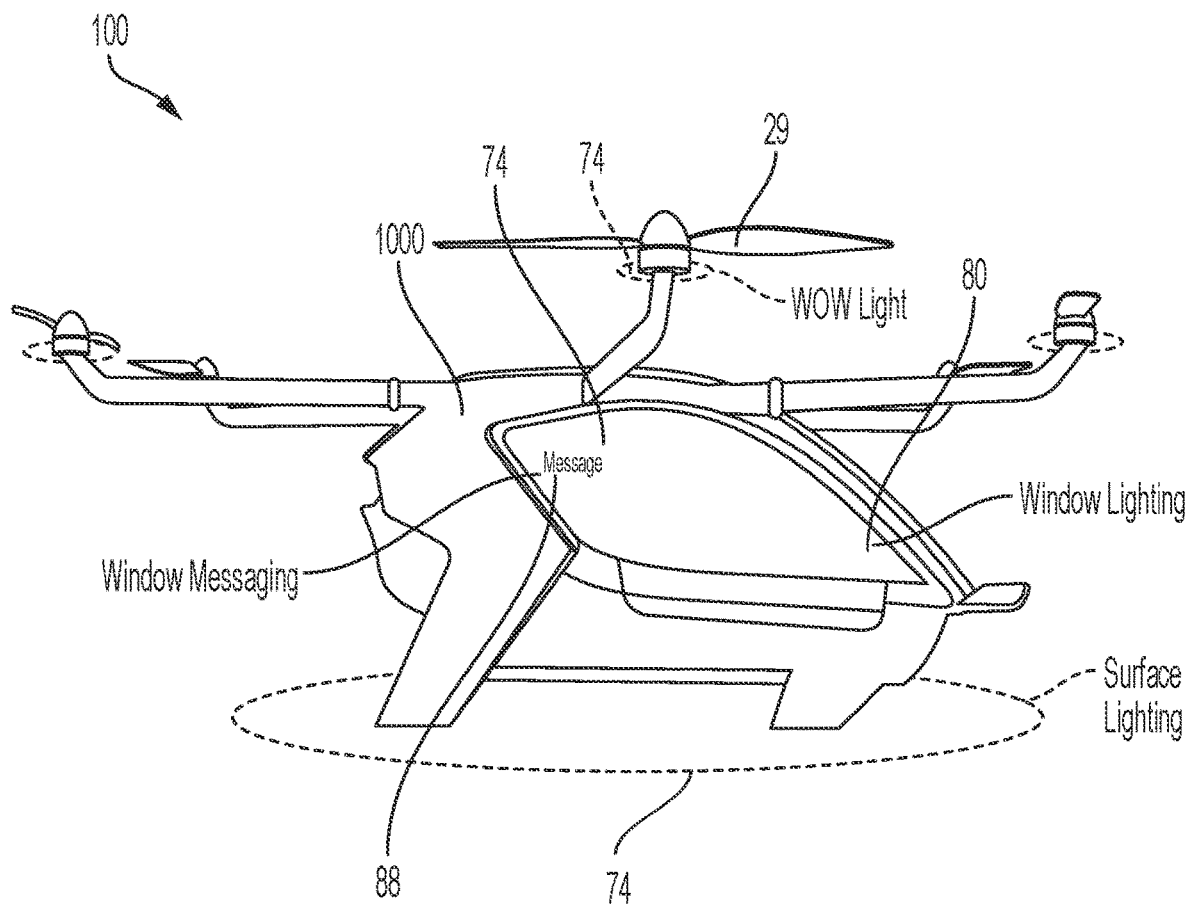
FIG. 8 depicts an example configuration of various dynamic light elements disposed throughout a multirotor air vehicle.

FIG. 8 depicts an example configuration of various the multifunction visual display nodes 72 comprising display elements 74 disposed throughout a multirotor air vehicle. Though capable of independent and autonomous operation, the screens 80, light emitting diodes (LED) 82, smart windows 84, augmented reality 86 displays, audio output 85, messaging 88 and user interfaces (UI) 90 can be controlled by processors 76 and controllers 94 to function in a combined, customized customer experience comprising patterns of actuation or pre-set levels or adjustments.

The audio output 85 can be provided by speakers or audio transducers implanted or attached to surfaces to provide audio. In certain embodiments the audio output can provide a sound cocoon.

Figure 9:
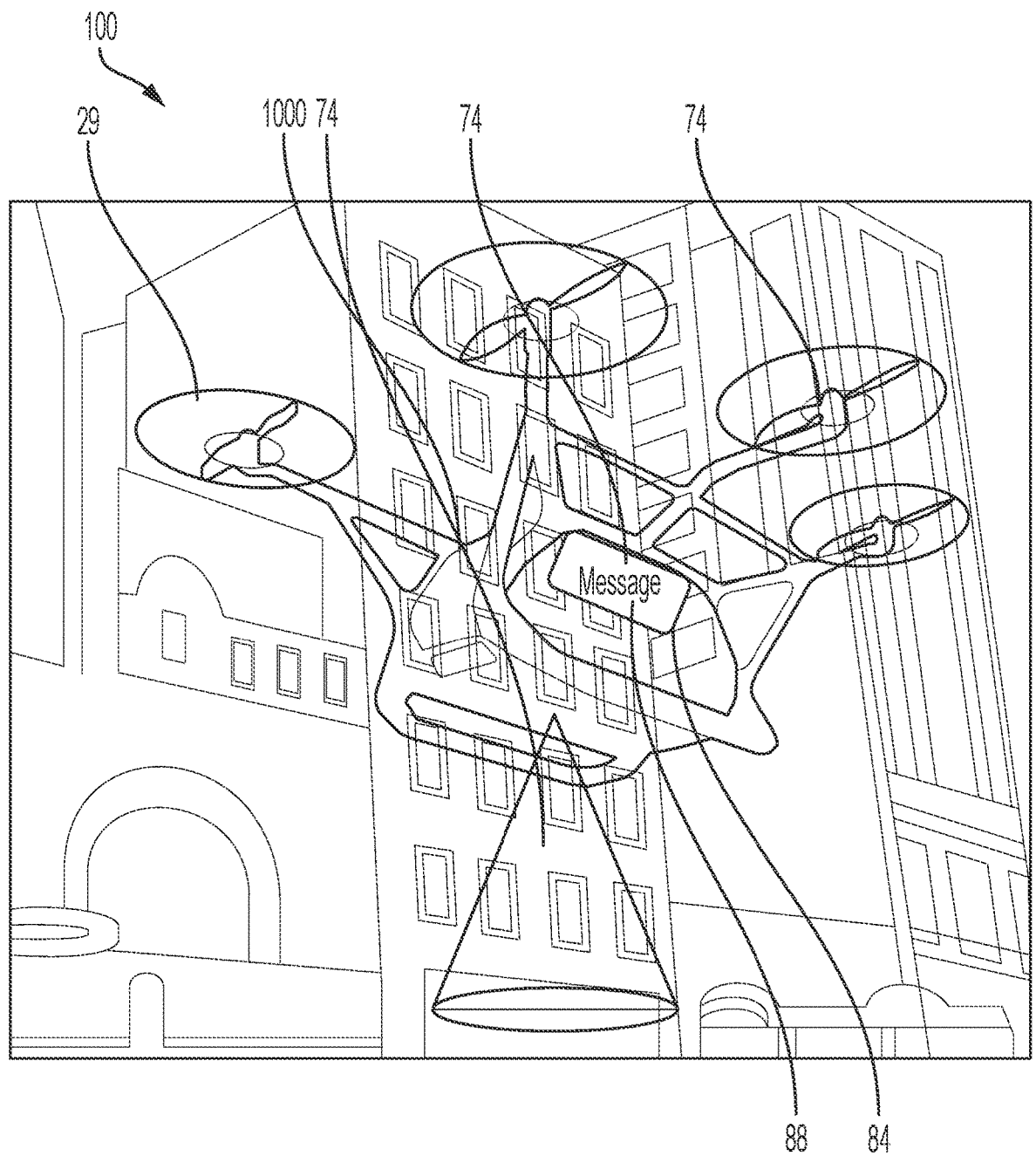
FIG. 9 depicts an example configuration of various dynamic light elements disposed on an exterior of a multirotor air vehicle.

FIG. 9 depicts an example configuration of various dynamic light elements disposed on an exterior of a multirotor air vehicle. Multifunction visual display nodes 72 can operate outward facing display elements 74 such that the one or more processors 76 and controllers 94 can broadcast or display visuals to users outside or below the vehicle, presenting important safety, procedural, advertising or informative data using one or more of screens 80; light emitting diodes (LED) 82; smart windows 84; augmented reality 86; and messaging 88.

Figure 10:
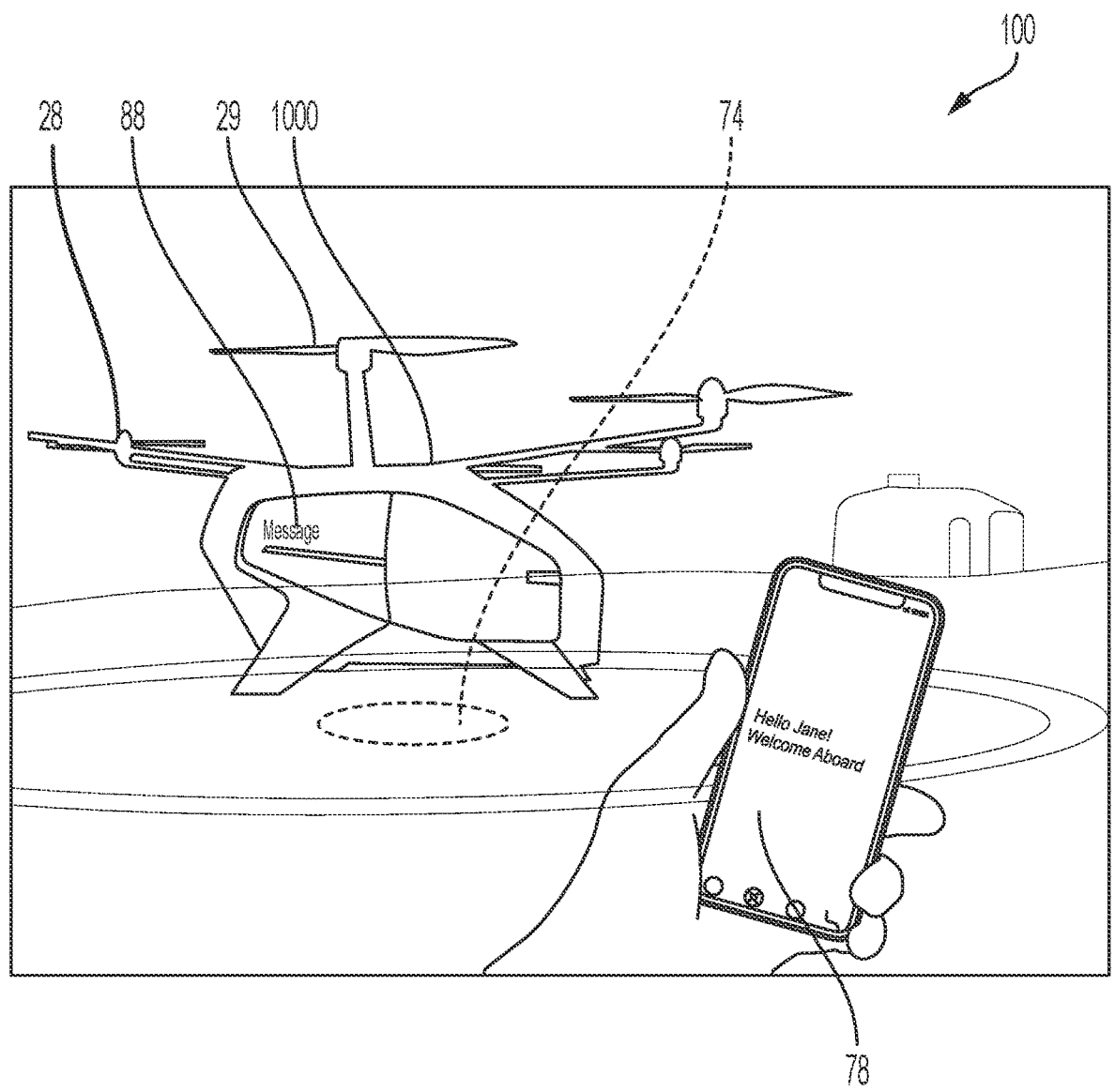
FIG. 10 depicts an example of messaging provided by multifunction visual display nodes.

FIG. 10 depicts an example of messaging 88 provided by multifunction visual display nodes. The system 100 uses available internet connectivity to identify by handshake or other protocol one or more user devices 78. The identification allows access to predefined sets of user information (e.g. user name) stored by the system 100 remotely or locally. The processor 76 and controllers 94 operate according to a stored welcome protocol by activating and commanding a subset of multifunction visual display nodes 72; display elements 74; to display a welcome message customized to the user to ensure both a positive user experience and confirmation of proper location. This can be accomplished using one or more of screens 80; light emitting diodes (LED) 82; smart windows 84; augmented reality 86; messaging 88; and user interfaces (UI) 90.

Figure 11:
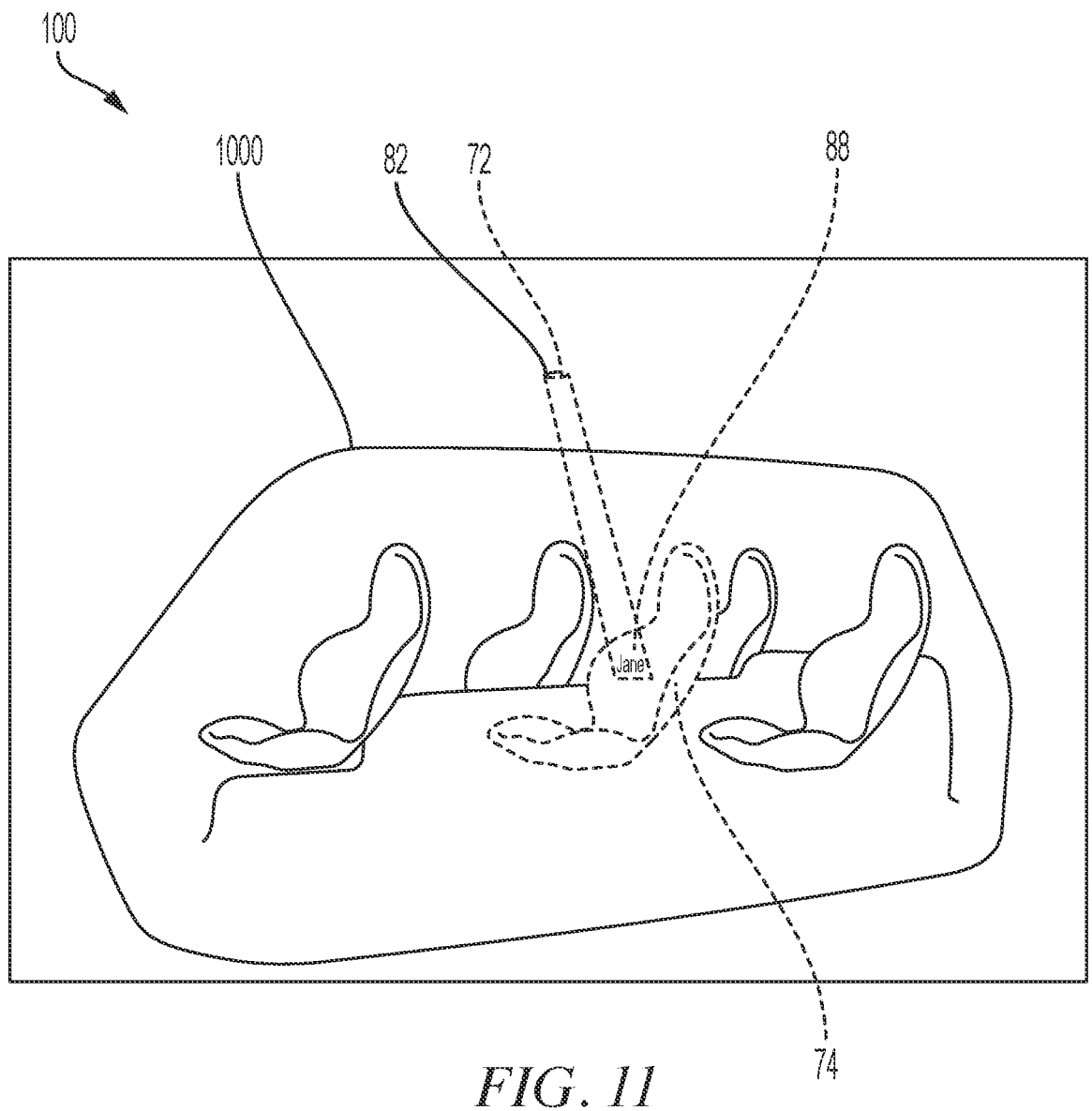
FIG. 11 depict an example of focused and messaging dynamic light elements used to illuminate a seat to indicate a seating assignment triggered/initiated by a user device arriving within proximity threshold of the multirotor air vehicle.

FIG. 11 depicts an example use of a focused lamp comprising light emitting diodes (LED) 82, seat lighting, and messaging 88 display elements 74 used together to illuminate and identify a seat to indicate a seating assignment wherein functions of the multiple multifunction visual display nodes 72 are triggered or initiated by a user device 78 arriving within a proximity threshold of the multirotor air vehicle.

Figure 12:
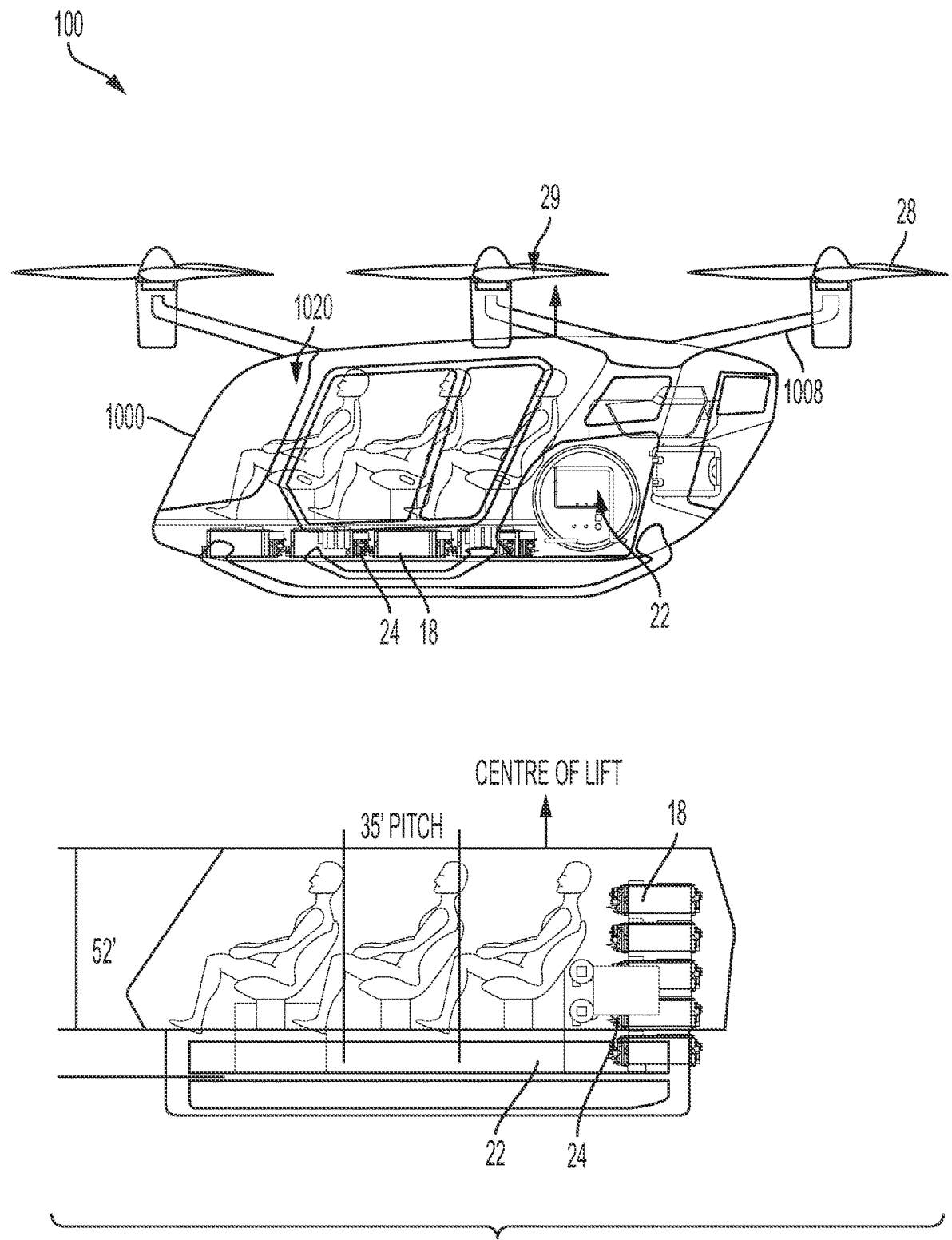
FIG. 12 depicts an example diagram of a multirotor air vehicle cabin interior configuration.

FIG. 12 depicts example profile diagrams of a multirotor air vehicle 1000 cabin interior configuration positions of fuel supply and power generation subsystem within the multirotor air vehicle 1000. Multifunction visual display nodes 72 may be disposed in conjunction with other components to assist in operation of said components or provide additional information regarding said components.

Figure 13:
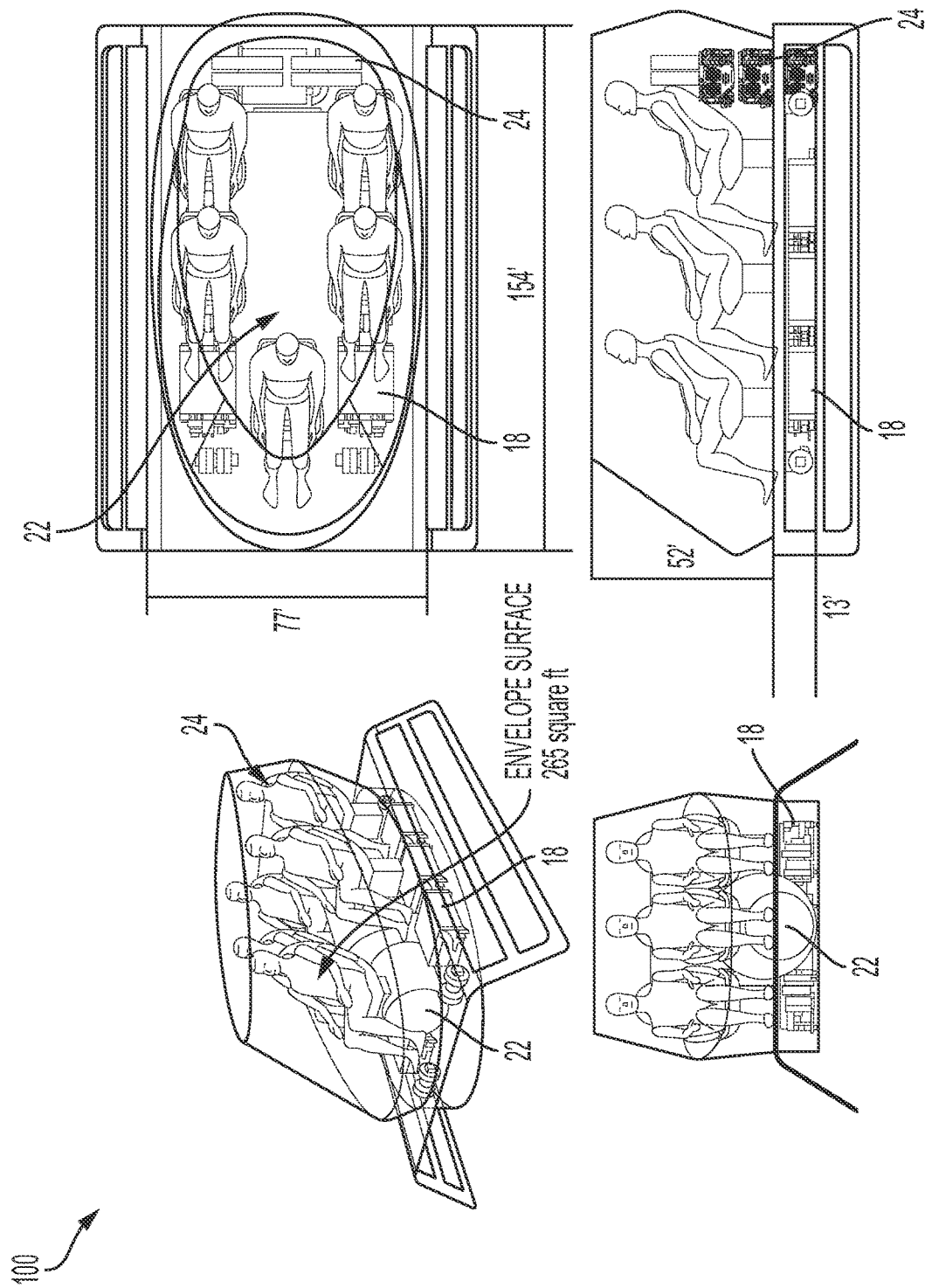
FIG. 13 depicts an example arrangement of interior components of a multirotor air vehicle.

FIG. 13 depicts another example arrangement of interior components of a multirotor air vehicle.

Figure 14:
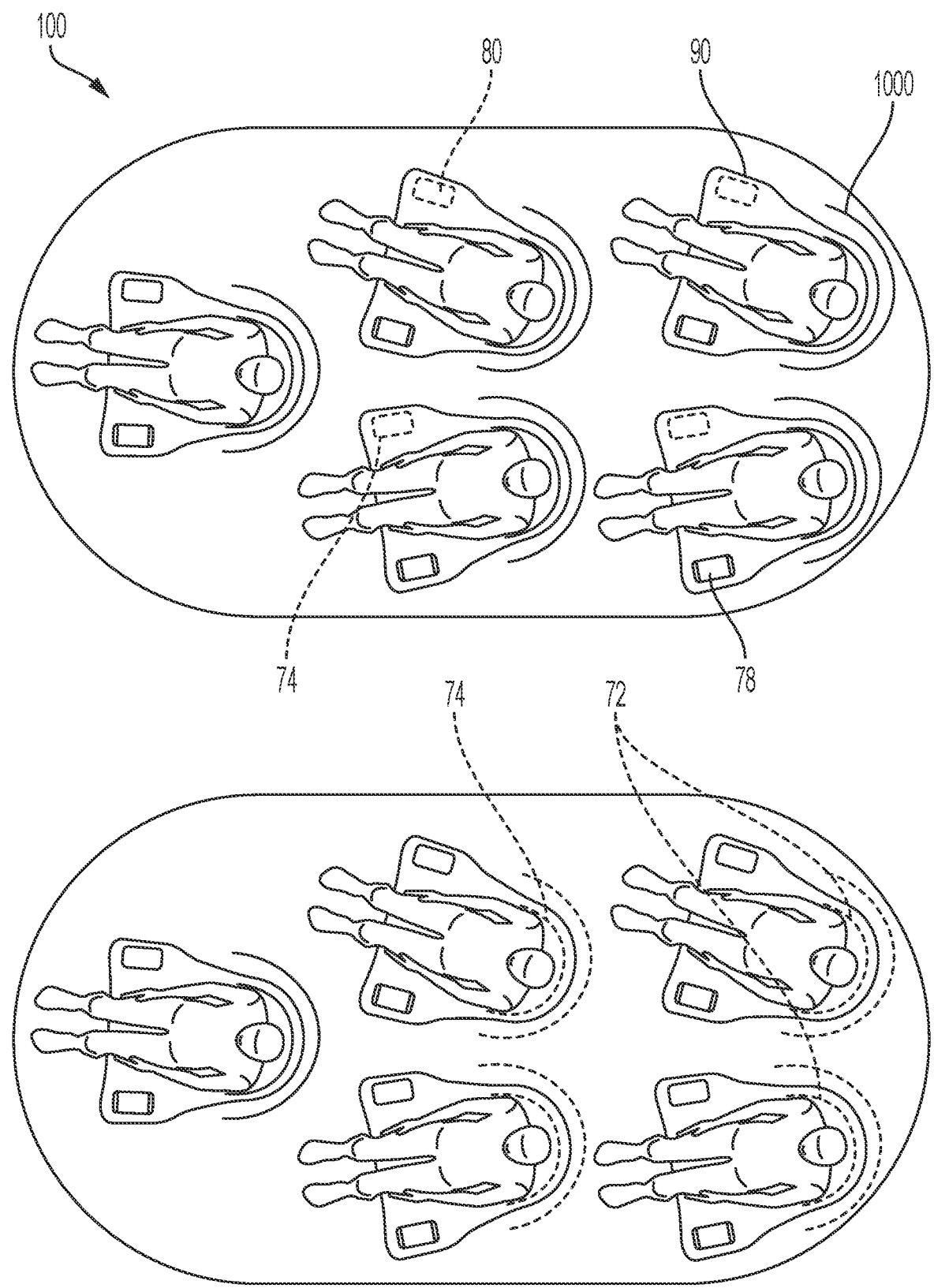
FIG. 14 depicts; an example configuration of connected node components and integrated devices including various subsystems and sensors.

FIG. 14 depicts an example configuration of connected multifunction visual display nodes 72 and components and integrated devices including various subsystems and sensors. User devices 78 and one or more onboard user interfaces (UI) 90 can be interoperated to alter or adjust display elements 74 such as screens 80, light emitting diodes (LED) 82, smart windows 84, augmented reality 86 displays and community messaging 88 displays throughout the cabin interior. Both can access the same information simultaneously due to high speed internet connectivity and redundant processing capabilities that can independently supply each passenger multiple devices functioning in an interactive experience.

Figure 15:
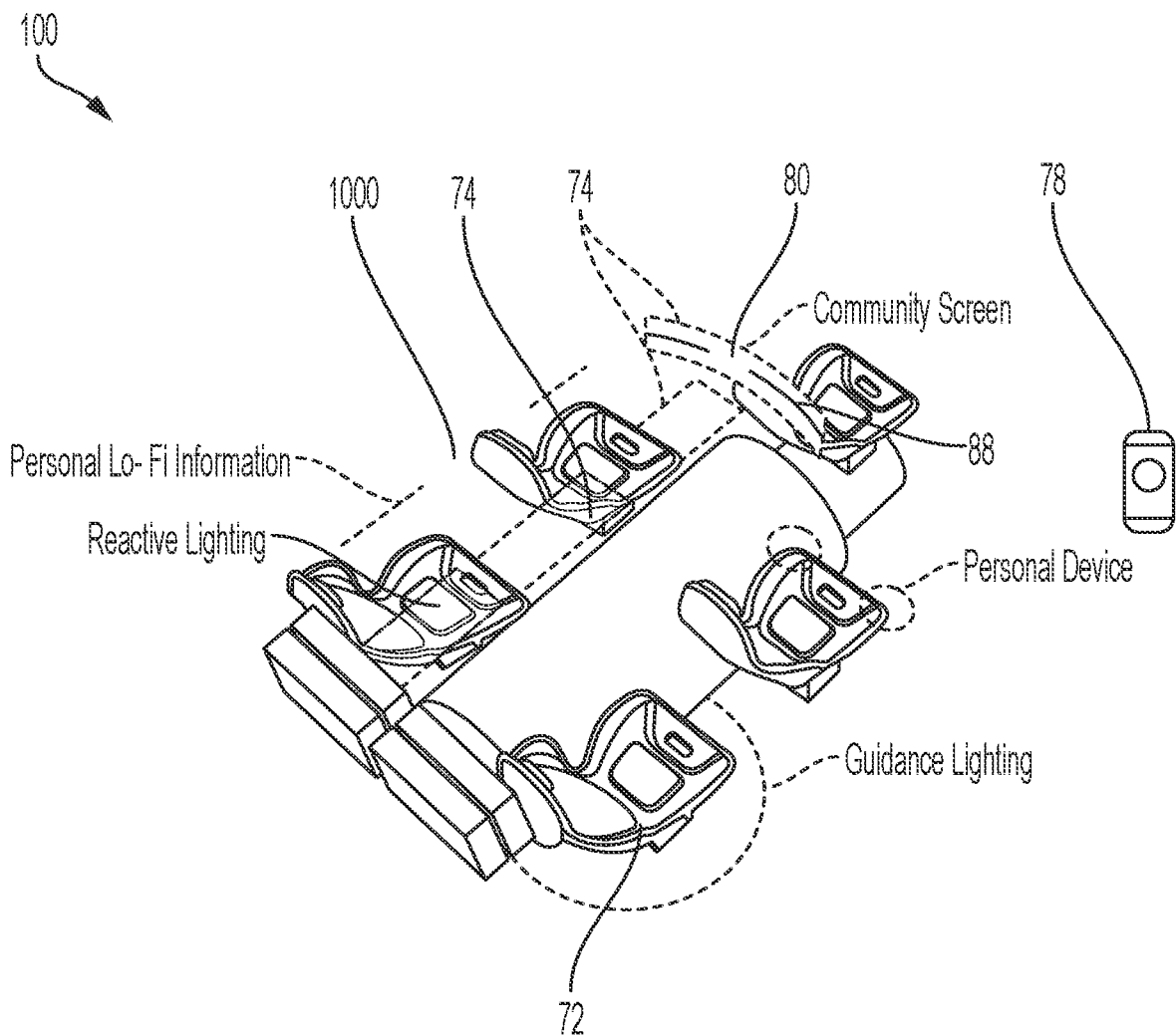
FIG. 15 depicts an example configuration of various dynamic light elements disposed in components and devices throughout the interior of a multirotor air vehicle.

FIG. 15 depicts an example configuration of various dynamically functioning display elements 74 disposed in components and devices throughout the interior of a multirotor air vehicle. Multifunction visual display nodes 72 including those comprising, messaging 88, user interfaces (UI) 90, customer experience seat lighting, surface lighting, personal LoFi information light emitting diodes (LED) and Community screens 80 are all simultaneously presenting interactive visuals for users on board.

Figure 16:
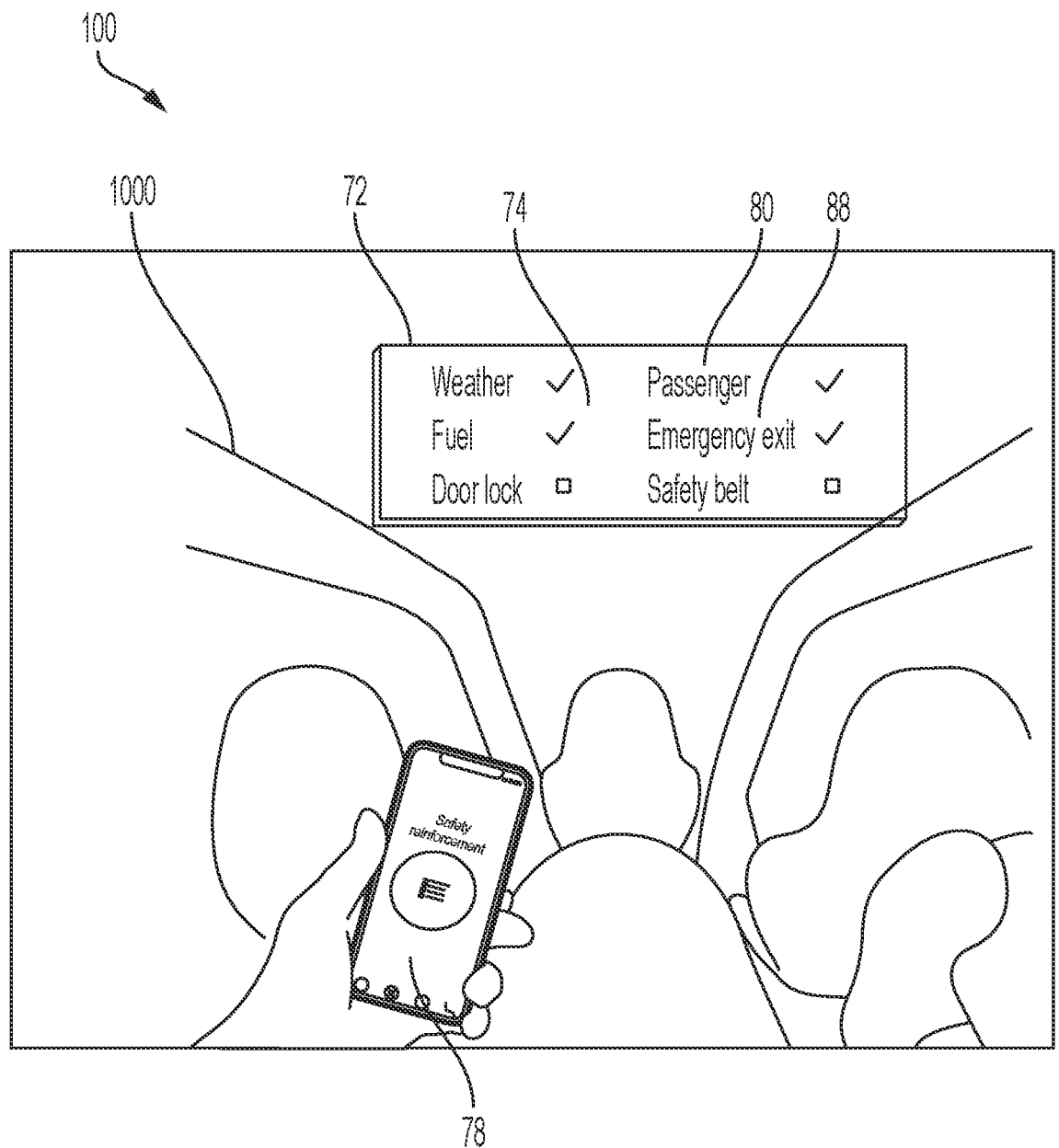
FIG. 16 depicts example user device input initiated vehicle interaction; example vehicle information selectable by a user device for additional interaction.

FIG. 16 depicts example user device 78 input initiated vehicle interaction using vehicle information selectable by a user device 78 for additional interaction that is presented by multifunction visual display nodes 72 display elements 74 in the form of messaging 88 screens 80, particularly a set of menus to navigate to further interact.

Figure 17:
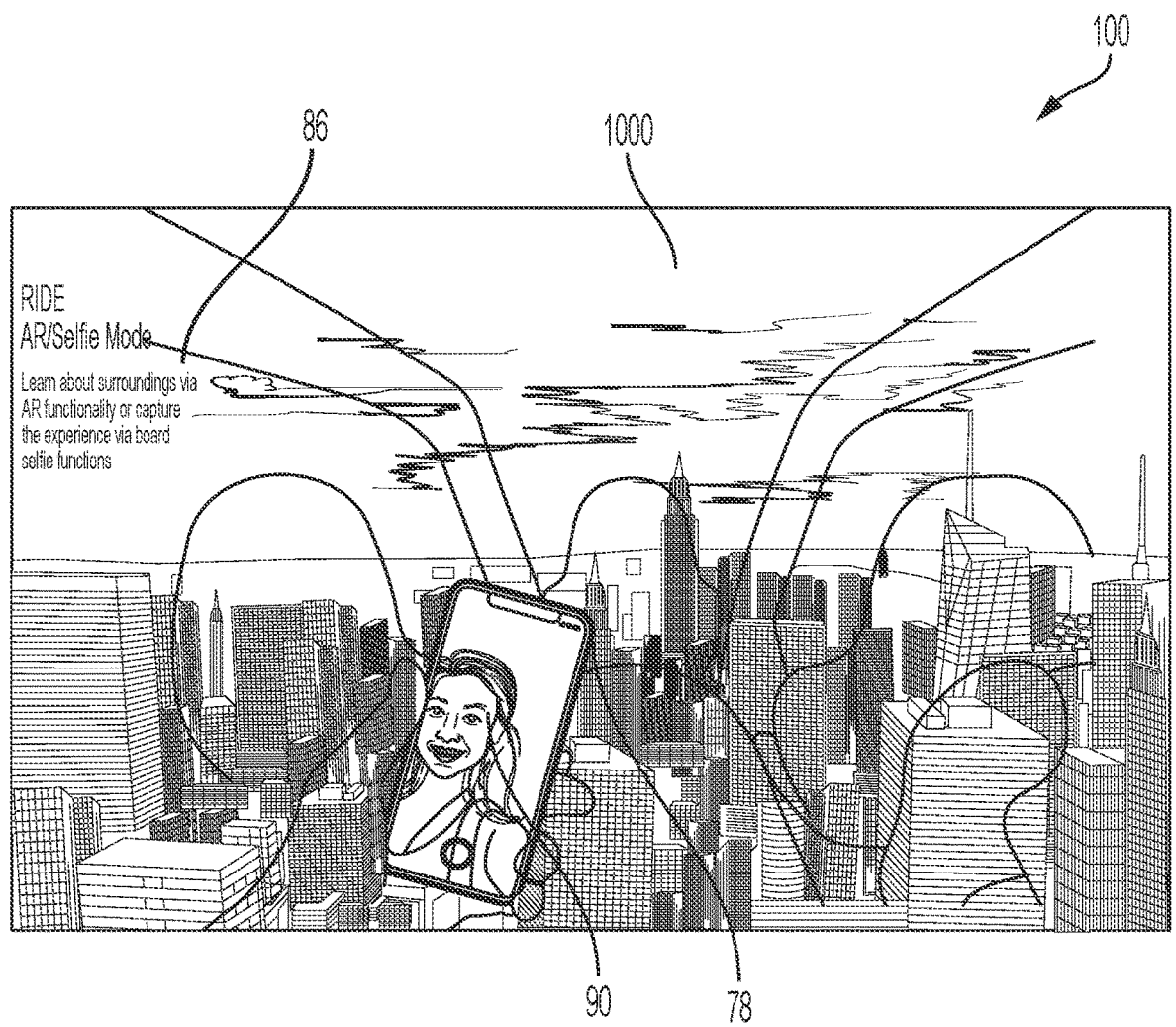
FIG. 17 depicts an example configuration and integrated devices including various subsystems and sensors used in an augmented reality display.

FIG. 17 depicts an example configuration and integrated devices including various subsystems and sensors used in an augmented reality 86 display. Multifunction visual display nodes 72; connect to processors 76 of the system to provide additional data and explorable interactive functionality display elements 74 including smart windows 84 and messaging 88 according to commands input from a user interface (UI) 90 of a user device 78.

Figure 18:
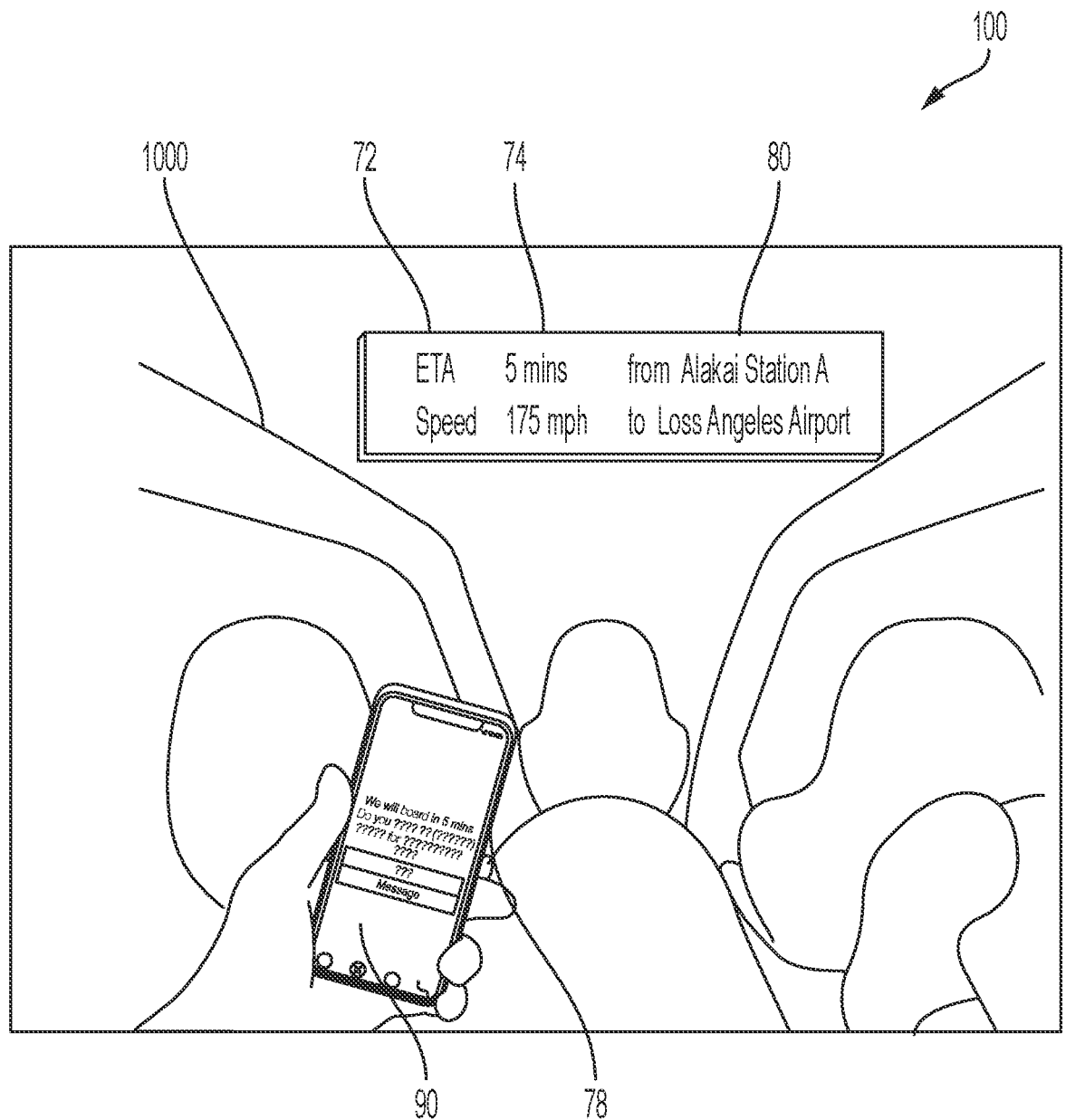
FIG. 18 depicts example departure and last mile information presented on a device based upon vehicle sensor data indicating imminent arrival at a destination.

FIG. 18 depicts example departure and last mile information presented on a device 78 based upon vehicle sensor data indicating messaging 88 of imminent arrival at a destination. Multifunction visual display nodes 72 are triggered by the arrival of the air vehicle denoted by various sensor output that in turn accesses data about the user and then uses processors 76, controllers 94 and display elements 74 (e.g. screens 80) to provide user devices 78 with data displayed additionally on a user interface (UI) 90 of the device to ensure convenient access to information assisting in departure.

Figure 19:
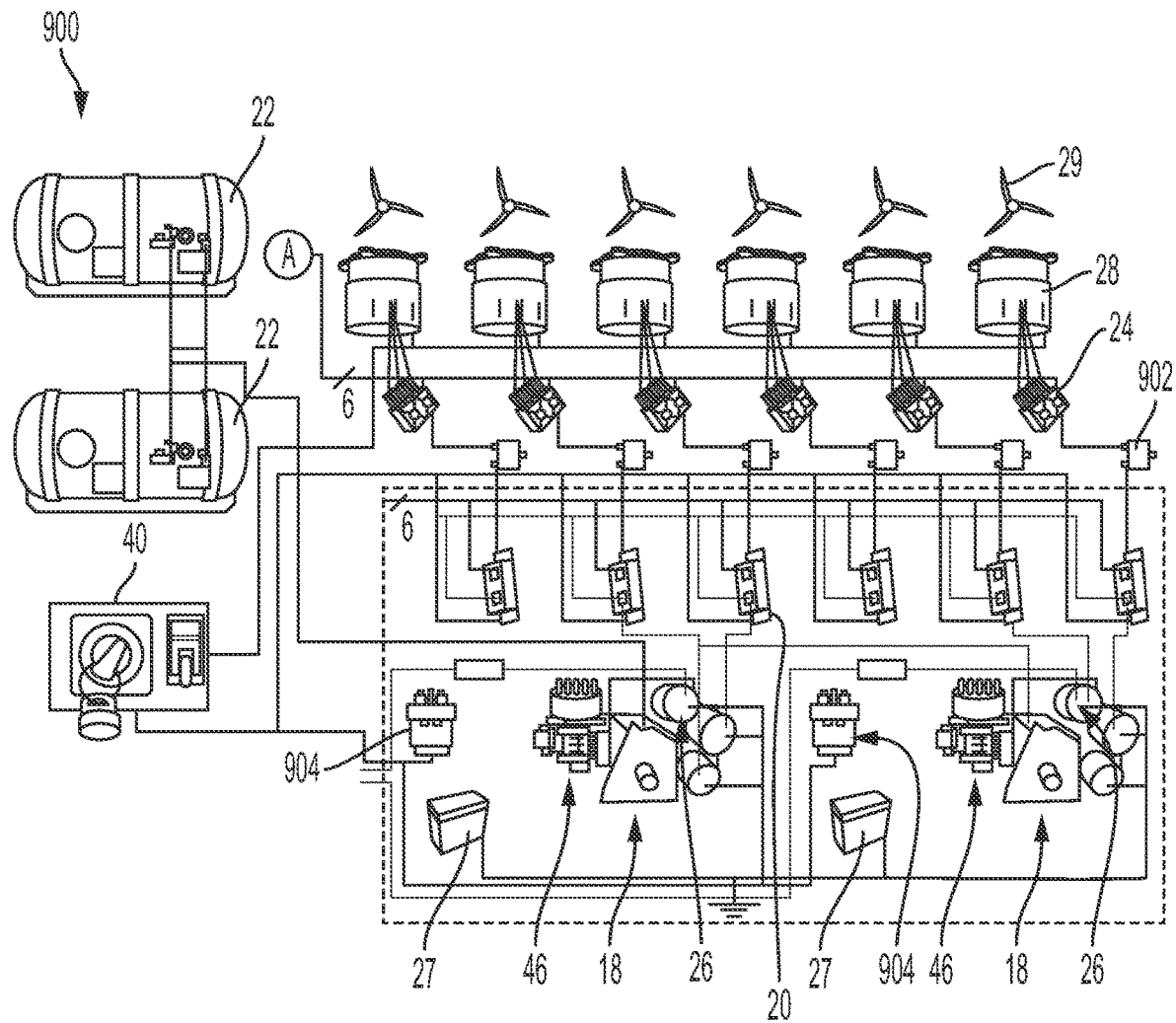
FIG. 19 depicts example electrical and systems connectivity of various fuel cell, fuel supply, power generation, and motor control components various sensors of a multirotor air vehicle integrated with the system of the invention.

FIG. 19 depicts electrical and systems connectivity of various fuel cell, fuel supply, power generation, and motor control components various sensors of a multirotor air vehicle integrated with the system of the invention; an example configuration and integrated devices including various subsystems and sensors; motor control components of a system of the invention, as well as an example fuel supply subsystem 900 for the multirotor air vehicle 1000. The electrical connectivity includes six motor and propeller assemblies 28 (of a corresponding plurality of motors and propellers 29) and the electrical components needed to supply the motor and propeller combinations with power. A high current contactor 904 is engaged and disengaged under control of the vehicle key switch 40, which applies voltage to the starter/generator 26 to start the fuel cell modules 18. In accordance with an example embodiment of the present invention, after ignition, the fuel cell modules 18 (e.g., one or more hydrogen-powered fuel cells or hydrocarbon-fueled motors) create the electricity to power the six motor and propeller assemblies 28 (of multiple motors and propellers 29). A power distribution monitoring and control subsystem with circuit breaker 902 autonomously monitors and controls distribution of the generated electrical voltage and current from the fuel cell modules 18 to the plurality of motor controllers 24. As would be appreciated by one skilled in the art, the circuit breaker 902 is designed to protect each of the motor controllers 24 from damage resulting from an overload or short circuit. Additionally, the electrical connectivity and fuel supply subsystem 900 includes diodes or FETs 20, providing isolation between each electrical source and an electrical main bus and the fuel cell modules 18. The diodes or FETs 20 are also part of the fail-safe circuitry, in that they diode-OR the current from the two sources together into the electrical main bus. For example, if one of the pair of the fuel cell modules 18 fails, the diodes or FETs 20 allow the current provided by the now sole remaining current source to be equally shared and distributed to all motor controllers 24. Such events would clearly constitute a system failure, and the autopilot computers 32 would react accordingly to land the air vehicle safely as soon as possible. Advantageously, the diodes or FETs 20 keep the system from losing half its motors by sharing the remaining current. Additionally, the diodes or FETs 20 are also individually enabled, so in the event that one motor fails or is degraded, the appropriate motor and propeller combinations 28 (of multiple motors and propellers 29—e.g. the counter-rotating pair) would be disabled. For example, the diodes or FETs 20 would disable the enable current for the appropriate motor and propeller combinations 28 (of multiple motors and propellers 29) to switch off that pair and avoid imbalanced thrust. In accordance with an example embodiment of the present invention, the six motor and propeller combinations 28 (of multiple motors and propellers 29) each include a motor and a propeller 29 and are connected to the motor controllers 24, that control the independent movement of the six motors of the six motor and propeller combinations 28. As would be appreciated by one skilled in the art, the electrical connectivity and fuel supply subsystem 900 may be implemented using 6, 8, 10, 12, 14, 16, or more independent motor controllers 24 and the motor and propeller assemblies 28 (of a plurality of motors and propellers 29).

Continuing with FIG. 19, the electrical connectivity and fuel supply subsystem 900 also depicts the redundant battery module system as well as components of the DC charging system. The electrical connectivity and fuel supply subsystem 900 includes the fuel tank 22, the avionics battery 27, the pumps (e.g. water or fuel pump) and cooling system 44, the supercharger 46, and a starter/alternator. The fuel cells 18 are fed by on-board fuel tank 22 and use the fuel to produce a source of power for the motor and propeller combinations 28. As would be appreciated by one skilled in the art, the fuel cell modules 18 can include one or more hydrogen-powered fuel cells can be fueled by hydrogen or other suitable gaseous fuel 30, to drive or turn multiple motors and propellers 29. The sensors monitoring these components, and self-monitoring components themselves, can supply the multifunction visual display nodes 72 with data or information used to provide automated adjustment of display elements 74.

The methods 400 and systems 100 described herein are not limited to a particular air vehicle 1000 or hardware or software configuration and may find applicability in many air vehicle or operating environments. For example, the algorithms described herein can be implemented in hardware or software, or a combination thereof. The methods 400 and systems 100 can be implemented in one or more computer programs, where a computer program can be understood to include one or more processor executable instructions. The computer program(s) can execute on one or more programmable processors and can be stored on one or more storage medium readable by the processor (including volatile and non-volatile memory and/or storage elements), one or more input devices, and/or one or more output devices. The processor thus can access one or more input devices to obtain input data and can access one or more output devices to communicate output data. The input and/or output devices can include one or more of the following: a mission control tablet computer 36, mission planning software 34 program, throttle pedal, sidearm controller, yoke or control wheel, or other motion-indicating device capable of being accessed by a processor, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

As provided herein, the processor(s) can thus in some embodiments be embedded in three identical devices that can be operated independently in a networked or communicating environment, where the network can include, for example, a Local Area Network (LAN) such as Ethernet, or serial networks such as RS232 or CAN. The network(s) can be wired, wireless RF, fiber optic or broadband, or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices to perform the necessary algorithms and determine the appropriate vehicle commands, and if implemented in three units, the three units can vote among themselves to arrive at a 2 out of 3 consensus for the actions to be taken. As would be appreciated by one skilled in the art, the voting can also be carried out using another number of units (e.g., one two, three, four, five, six, etc.). For example, the voting can use other system-state information to break any ties that may occur when an even number of units disagree, thus having the system arrive at a consensus that provides an acceptable level of safety for operations.

The device(s) or computer systems that integrate with the processor(s) for displaying presentations can include, for example, a personal computer with display, a workstation (e.g., Sun, HP), a personal digital assistant (PDA) or tablet such as an iPad, or another device capable of communicating with a processor(s) that can operate as provided herein. Accordingly, the devices provided herein are not exhaustive and are provided for illustration and not limitation.

References to "a processor" or "the processor" can be understood to include one or more processors that can communicate in a stand-alone and/or a distributed environment(s), and thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. References to a network, unless provided otherwise, can include one or more networks, intranets and/or the internet.

Although the methods and systems have been described relative to specific embodiments thereof, they are not so limited. For example, the methods and systems may be applied to a variety of multirotor vehicles having 6, 8, 10, 12, 14, 16, or more independent motor controllers 24 and motors, thus providing differing amounts of lift and thus payload and operational capabilities. The system may be operated under an operator's control, or it may be operated via network or datalink from the ground. The vehicle may be operated solely with the onboard avionics battery 27 storage capacity, or it may have its capacity augmented by an onboard motor-generator or other recharging source, or it may even be operated at the end of a tether or umbilical cable for the purposes of providing energy to the craft. Many modifications and variations may become apparent in light of the above teachings and many additional changes in the details, materials, and arrangement of parts, herein described and illustrated, may be made by those skilled in the art.

What is claimed is:

1. An integrated multifunctional dynamic display system for an air vehicle that provides an interactive audio and visual user experience on the vehicle, the system comprising: an array of multifunction visual display nodes disposed throughout the air vehicle so as to be inward facing on an interior surface and outward facing on an exterior surface of the air vehicle, the array of multifunction visual display nodes in communication with a wired or wireless databus or network, each node comprising: a transceiver connecting the node to the databus or network; a processor in communication with the transceiver; and a display element configured to alter function in response to commands received via the databus or network; wherein the array of multifunction visual display nodes is configured to provide: cabin lighting, seat lighting, seat messaging, window lighting, window messaging, exterior surface lighting, and exterior surface messaging or advertising.

2. The system of claim 1, wherein the databus or network comprises a Controller Area Network (CAN).

3. The system of claim 1, wherein each node further comprises an audio output.

4. The system of claim 1, wherein each display element has a dedicated electrical power line and a network connection and a dedicated protocol address making each display element uniquely addressable using network commands enabling varying of display element output with a defined protocol.

5. The system of claim 1, wherein the processor of each of the multifunction visual display nodes comprise one or more of a central processing unit (CPU), a microprocessor, or a control unit, each collectively programmed to activate a respective one or more of the multifunction visual display nodes based on different patterns received by commands to create a borderless combined display across multiple of the multifunction visual display nodes disposed on a vehicle.

6. The system of claim 1, wherein the display element comprises one or more of screens, light boards, lamps, smart windows, strips, arrays, surfaces, fixtures, beacons, LED chains, LED embedded components LCD displays, smart glass, and LED or LCD embedded surfaces.

7. The system of claim 1, wherein the display element comprises an array of multicolor LEDS or display elements.

8. The system of claim 1, wherein one or more of the multifunction visual display nodes are controlled by one or more of interfaces, sensors, switches, actuators and controls.

9. The system of claim 1, wherein the system is configured for a user device to accesses a control interface and input commands delivered to one or more of the multifunction visual display nodes, altering output of display elements disposed on the air vehicle.

10. The system of claim 1, wherein a remote processor is configured to provide commands delivered to the multifunction visual display nodes, altering output of the display elements disposed on the air vehicle.

11. The system of claim 1, wherein one or more onboard processors or sensors are configured to provide commands delivered to the multifunction visual display nodes, altering output of the display elements disposed on the air vehicle.

12. The system of claim 1, wherein commands delivered to the multifunction visual display nodes, altering output of the display elements disposed on the air vehicle are based on user information access from a stored user account.

13. The system of claim 1, wherein one or more display elements are linked to display a customizable borderless message comprising alphanumeric characters digitally depicted by a plurality of display elements.

14. The system of claim 1, wherein one or more multifunction visual display nodes are configured for wireless internet connection such that the one or more multifunction visual display nodes accessed via air-to-ground or ground-to-air networking using native processors of the communications networks or an on-board communications hub together with one or more user devices or one or more display elements comprising screens as a user interface.

15. The system of claim 14, wherein one or more display elements are configured to alter streaming characters represented by LEDS on a screen based upon downloadable output supplied using air-to-ground and/or ground-to-air networking.

16. The system of claim 1, wherein one or more display elements comprise lamps or LEDs and are configured to receive command signals and/or varying voltage that accordingly alter one or more of light color, light wavelength emitted, lighting level, light transmission through a medium, light reflection, light refraction, light intensity, light brightness, light hue, luminosity, light positioning, light direction, light focusing, light timing, light flashing intervals, NAV display, lighting mode, menu item or projected message content.

17. The system of claim 1, wherein one or more display elements comprise lamps or LEDs and are configured to receive command signals and/or varying voltage that accordingly alter one or more of focus, synchronization, or timing of multiple LEDS to project light to a particular object within a vehicle interior.

18. The system of claim 1, wherein vehicle or flight data is selectively accessed by operation of one or more of user interfaces, sensors, switches, actuators, control devices, touch screens, touch controls, GUIs, consoles, remote processors, user electronic devices, based upon programmed parameters associated with a requesting device and identified by the system using the processor and onboard or remotely stored data.

19. The system of claim 1, wherein one or more display elements are configured to receive command signals that alter transmittance of a set of one or more screens or windows to adjust an ambient lighting level or opacity according to input user comfort preferences.

20. The system of claim 1, wherein one or more display elements are configured to receive command signals that alter a set of one or more screens or windows to provide an augmented reality display supplementing information related to objects viewed through the one or more screens or windows with reference to the user or the interior of the air vehicle.

21. The system of claim 1, wherein one or more display elements are configured to receive command signals that alter functions according to one or more onboard sensor outputs.

22. The system of claim 21, wherein the one or more onboard sensor outputs comprise output from one or more of an embedded or stand-alone air data computer, an embedded or stand-alone inertial measurement device, automatic computer monitoring by programmed single or redundant digital autopilot control units, motor management computers, air data sensors, temperature sensors, thermocouples, thermometers, embedded GPS receivers, GPS devices, inertial sensors, motion sensors, collision sensors, proximity sensors, pressure sensors, pressure gauges, level sensors, vacuum gauges, fuel gauges, fluid gauges, pump sensors, magnetic sensors, valve sensors, pressure safety valves, pressure regulators, pressure build units, monitor, air sensors and airflow oxygen sensors fuel cell modules configured to self-measure, motor controllers configured to self-measure and report parameters using the databus or network and sensor devices designed to measure one or more of air speed, vertical speed, pressure altitude, GPS altitude, GPS latitude, GPS longitude, outside-air temperature (OAT), pitch angle, bank angle, yaw angle, pitch rate, bank rate, yaw rate, longitudinal acceleration, lateral acceleration, and vertical acceleration.

23. The system of claim 22, wherein functions of one or more display elements are altered according to pre-programmed settings initiated in response to received onboard sensor output.

24. The system of claim 1, wherein output of one or more display elements comprises one or more of onboard warning messages, updated notifications, emergency messages, emergency instructions or evacuation data.

25. The system of claim 1, wherein output of one or more display elements comprises one or more of boarding location information, seat locating information, safety procedure information, entertainment use information, connectivity instructions, customized to a specific user identified by the system.

26. The system of claim 1, wherein output of one or more display elements comprises one or more of a welcome message, a departure message, a destination message, and last mile data customized to a specific user identified by the system using stored user data or stored data from the user reservation and/or user devices and/or social media identified by the system as onboard.

27. The system of claim 1, wherein output of one or more display elements comprises a dynamic pattern of illumination indicating a direction of travel to embark or disembark.

28. A method of providing an interactive audio and visual user experience on an air vehicle, the method comprising: providing an array of multifunction visual display nodes disposed throughout the air vehicle so as to be inward facing on an interior surface and outward facing on an exterior surface of the air vehicle, the array of multifunction visual display nodes in communication with a databus or network, each node comprising: a transceiver connecting the node to the databus or network; a processor in communication with the transceiver; an audio output; and a display element configured to alter function in response to commands received via the databus or network; wherein the array of multifunction visual display nodes is configured to provide: cabin lighting, seat lighting, seat messaging, window lighting, window messaging, exterior surface lighting, and exterior surface messaging or advertising; receiving, at a transceiver of a node, a command via the databus or network; and altering the function of the display element of the node as directed by the processor in response to the received command.

* * * * *